United States Patent
Takeda et al.

(10) Patent No.: US 10,802,318 B2
(45) Date of Patent: Oct. 13, 2020

(54) TRANSPARENT SUBSTRATE WITH ANTIFOULING FILM AND CAPACITANCE IN-CELL TOUCH PANEL-TYPE LIQUID CRYSTAL DISPLAY DEVICE

(71) Applicant: AGC Inc., Chiyoda-ku (JP)

(72) Inventors: Yosuke Takeda, Chiyoda-ku (JP); Toru Ikeda, Chiyoda-ku (JP); Takamichi Shimosaka, Chiyoda-ku (JP); Takaaki Murakami, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 127 days.

(21) Appl. No.: 15/984,651

(22) Filed: May 21, 2018

(65) Prior Publication Data

US 2018/0335659 A1    Nov. 22, 2018

(30) Foreign Application Priority Data

May 22, 2017   (JP) .................................. 2017-100632

(51) Int. Cl.
| | | |
|---|---|---|
| *G02F 1/1333* | (2006.01) | |
| *G02F 1/1335* | (2006.01) | |
| *G06F 3/044* | (2006.01) | |
| *G06F 3/041* | (2006.01) | |
| *G02F 1/35* | (2006.01) | |

(52) U.S. Cl.
CPC .... *G02F 1/13338* (2013.01); *G02F 1/133502* (2013.01); *G02F 1/133504* (2013.01); *G06F 3/044* (2013.01); *G02F 2001/133331* (2013.01); *G02F 2001/3505* (2013.01); *G06F 3/0412* (2013.01)

(58) Field of Classification Search
None
See application file for complete search history.

(56) References Cited

U.S. PATENT DOCUMENTS

2007/0104896 A1* 5/2007 Matsunaga .......... G02B 5/3016
                                                         428/1.3
2007/0266896 A1  11/2007 Suwa et al.
2010/0196687 A1*  8/2010 Isono ................ G02F 1/133502
                                                         428/220

FOREIGN PATENT DOCUMENTS

WO    WO 2005/121265 A1    12/2005

* cited by examiner

*Primary Examiner* — James A Dudek
(74) *Attorney, Agent, or Firm* — Oblon, McClelland, Maier & Neustadt, L.L.P.

(57) ABSTRACT

There is provided a transparent substrate with an antifouling film that, when used as a cover member with an antifouling film of an electrostatic in-cell touch panel-type liquid crystal device, can reduce the whitening of a liquid crystal screen while fully maintaining an antifouling property and touch sensitivity. The transparent substrate with an antifouling film includes: a transparent substrate; and an antifouling film provided as an outermost layer on one main surface of the transparent substrate, wherein a surface shape of the antifouling film is a rugged shape whose arithmetic mean roughness Ra is 0.01 μm or more, and surface resistivity measured on the surface of the antifouling film is $1.0 \times 10^9$ to $1.0 \times 10^{13} \Omega/$.

20 Claims, 4 Drawing Sheets

TRANSPARENT SUBSTRATE WITH ANTIFOULING FILM AND CAPACITANCE IN-CELL TOUCH PANEL-TYPE LIQUID CRYSTAL DISPLAY DEVICE

CROSS-REFERENCE TO RELATED APPLICATIONS

This application is based upon and claims the benefit of priority from the prior Japanese Patent Application No. 2017-100632, filed on May 22, 2017 the entire contents of which are incorporated herein by reference.

TECHNICAL FIELD

The present invention relates to a transparent substrate with an antifouling film and a capacitance in-cell touch panel-type liquid crystal display device.

BACKGROUND

In recent years, liquid crystal display devices having a touch panel function, such as, for example, liquid crystal display devices provided in mobile liquid crystal terminals represented by smartphones, vehicles, and so on, and liquid crystal display devices of personal computers are widely used. As the liquid crystal display device having the touch panel function, an external type in which a touch panel is mounted on a liquid crystal display device has conventionally been used, but in recent years, what is called an in-cell touch panel-type liquid crystal display device has been put into practical use in which a touch function is incorporated in a liquid crystal element for the purpose of thickness and weight reduction.

However, out of the in-cell touch panel-type liquid crystal display devices, a capacitance type has a problem that its liquid crystal screen partially whitens when touched with a finger. It is considered that the whitening of the liquid crystal screen in the in-cell touch panel-type liquid crystal display device is ascribable to a difficulty in discharging external static electricity because of the absence of a conductive member more on an operator side than a liquid crystal element. Under such circumstances, in in-cell touch panel-type liquid crystal display devices, an attempt has been made to impart an electrostatic discharge (ESD) function by providing a conductive layer more on an operator side than a liquid crystal element, thereby reducing the whitening of a liquid crystal screen (refer to, for example, Patent Reference 1 (International Publication No. 2005/121265)).

In a touch panel-type liquid crystal display device, a cover glass is usually disposed on the most viewing side. In such a cover glass, a viewing-side surface is often formed of an antifouling film in order to facilitate removing stains such as fingerprints. However, if such a cover glass with an antifouling film is used in a capacitance touch panel-type liquid crystal display device of an in-cell type, the method described in Patent Reference 1 is not always capable of sufficiently reducing the whitening of a liquid crystal screen. Further, even if the whitening of the liquid crystal screen can be reduced by the ESD function, touch sensitivity is not sometimes sufficient.

SUMMARY

The present invention is made under such circumstances and has an object to provide a transparent substrate with an antifouling film that is capable of reducing the whitening of a liquid crystal screen while maintaining an antifouling property and touch sensitivity when used as a cover member with an antifouling film in a capacitance in-cell touch panel-type liquid crystal display device. It is an object of the present invention to provide a capacitance in-cell touch panel-type liquid crystal display device which has an antifouling property and suffers less whitening in its liquid crystal screen while sufficiently maintaining touch sensitivity.

The present invention has the following aspects.

[1] A transparent substrate with an antifouling film including: a transparent substrate; and an antifouling film provided as an outermost layer on one main surface of the transparent substrate, wherein a surface shape of the antifouling film is a rugged shape whose arithmetic mean roughness Ra is 0.01 µm or more, and surface resistivity measured on the surface of the antifouling film is $1.0 \times 10^9$ to $1.0 \times 10^{13} \Omega/$.

[2] A capacitance in-cell touch panel-type liquid crystal display device including: a capacitance in-cell touch panel-type liquid crystal display element; and a transparent substrate with an antifouling film, the transparent substrate with an antifouling film including: a transparent substrate; and an antifouling film provided as an outermost layer on one main surface of the transparent substrate, wherein a surface shape of the antifouling film is a rugged shape whose arithmetic mean roughness Ra is 0.01 µm or more, surface resistivity measured on the surface of the antifouling film is $1.0 \times 10^9$ to $1.0 \times 10^{13} \Omega/$, and the transparent substrate with an antifouling film is disposed on a viewing side of the liquid crystal display element, with the transparent substrate being located on a side facing the liquid crystal display element.

The transparent substrate with an antifouling film of the present invention has an antifouling property, and when used as a cover member of a touch panel, it can reduce an electric charge quantity during the use of the touch panel, and also has an antiglare property. The transparent substrate with an antifouling film of the present invention, especially when used as a cover member with an antifouling film in a capacitance in-cell touch panel-type liquid crystal display device, is capable of reducing the whitening of a liquid crystal screen while sufficiently maintaining an antifouling property and touch sensitivity, and also has an antiglare effect.

The present invention is capable of providing a capacitance in-cell touch panel-type liquid crystal display device which has an antifouling property, and suffers less whitening in its liquid crystal screen while sufficiently maintaining touch sensitivity. The capacitance in-cell touch panel-type liquid crystal display device of the present invention also has an antiglare property.

DETAILED DESCRIPTION

Figure 1:
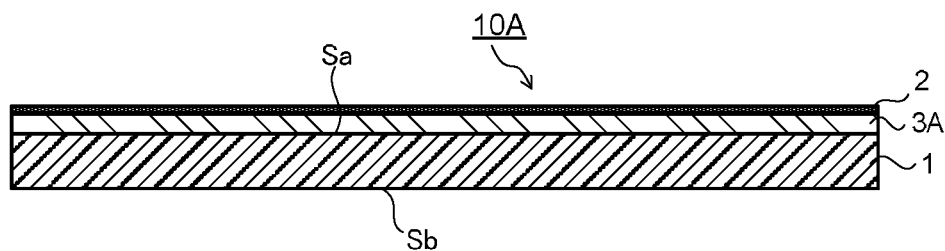
FIG. 1 is a schematic sectional view of an example of a transparent substrate with an antifouling film according to an embodiment.

Hereinafter, embodiments of the present invention will be described in detail.
[Transparent Substrate with Antifouling Film]
A transparent substrate with an antifouling film includes: a transparent substrate; and an antifouling film provided as an outermost layer on one main surface of the transparent substrate, and has the following characteristics (1) and (2).

(1) A surface shape of the antifouling film is a rugged shape whose arithmetic mean roughness Ra is 0.01 μm or more.

(2) Surface resistivity measured on the surface of the antifouling film is $1.0 \times 10^9$ to $1.0 \times 10^{13} \Omega/$.

In the transparent substrate with an antifouling film of the embodiment, the antifouling film refers to a film whose surface has water and oil repellency. In the transparent substrate with an antifouling film of the embodiment, the surface of the antifouling film refers to a main surface opposite to a transparent substrate side of the antifouling film, and the surface of the antifouling film is the same as an antifouling film-side main surface of the transparent substrate with an antifouling film.

The "arithmetic mean roughness Ra" is a mean value of absolute value deviations from a reference plane in a roughness curve included in a reference length taken on the reference plane. The arithmetic mean roughness Ra can be measured with SURFCOMI500 SD3-12 manufactured by Tokyo Seimitsu Co., Ltd. according to the methods stipulated in JIS B0601-2001, JIS B0632-2001, JIS B0633-2001, and MS B0651-2001. In the measurement, a stylus having a 2 μm tip radius and a 60-degree conical taper angle is used.

The "surface resistivity" is surface resistivity ($\Omega/$) which is measured with, for example, a super megohmmeter (SM-8220 manufactured by Hioki E.E. Corporation) under a 1000 V application voltage in a 22±2° C. temperature and 45±10% humidity environment, in conformity with JIS K6911, using an electrode for flat plate sample (SME-8311 manufactured by Hioki E.E. Corporation) as an electrode.

Owing to the above-described structure and characteristics (1) and (2) that the transparent substrate with an antifouling film of the embodiment has, when it is used as a cover member with an antifouling film of a capacitance in-cell touch panel-type liquid crystal display device, a finger contact area when it is touched with a finger becomes suitable and further an electric charge quantity and an ESD function are well-balanced, making it possible to reduce the whitening of a liquid crystal screen while sufficiently maintaining touch sensitivity. The antifouling film is a film having an antifouling property described below, and can keep the antifouling property even when having the characteristics (1) and (2). Further, in the transparent substrate with an antifouling film of the embodiment, owing to the rugged shape (1) that the surface of the antifouling film has, the finger contact area when it is touched with a finger (hereinafter, referred to simply as a "contact area") can be suitable, and in addition it also has an antiglare property.

The configuration of the transparent substrate with an antifouling film is not limited as long as it has the transparent substrate and the antifouling film provided as the outermost layer on one main surface of the transparent substrate and has the characteristics (1) and (2). The transparent substrate with an antifouling film of the embodiment may have various functional layers besides the transparent substrate and the antifouling film in order to attain the characteristics (1) and (2) or in order to have additional characteristics.

Here, in (1), the surface shape of the antifouling film is not formed by the antifouling film itself, and is obtained from the reflection of a surface shape of an antifouling film side of a member located more on a transparent substrate side than the antifouling film. Specifically, disposing an antiglare layer having the same surface shape as the surface shape of the antifouling film stipulated in (1) on a transparent substrate side of the antifouling film makes it possible to obtain the characteristic (1) in the transparent substrate with an antifouling film. Alternatively, forming the antifouling film-side surface of the transparent substrate in the same shape as the surface shape of the antifouling film stipulated in (1) makes it possible to obtain the characteristic (1). Further, from a view point of the antiglare property, in the transparent substrate with an antifouling film of the embodiment, a side opposite to the surface having the antifouling film may have the same surface shape as that in (1).

Note that the arithmetic mean roughness Ra in (1) is preferably 0.1 μm or less from a viewpoint of preventing an increase in haze of the obtained transparent substrate with an antifouling film.

Further, it is possible to obtain the surface resistivity in (2) by disposing a layer having conductivity between the antifouling film and the transparent substrate. The surface resistivity measured on the surface of the antifouling film is more preferably $1 \times 10^{10}$ to $1 \times 10^{13} \Omega/$ and still more preferably $1.0 \times 10^{10}$ to $1.0 \times 10^{12} \Omega/$.

The transparent substrate with an antifouling film of the embodiment preferably has the following characteristics in addition to the aforesaid characteristics (1) and (2).

(Water and Oil Repellency)

In the transparent substrate with an antifouling film, it is preferable that, on the surface of the antifouling film, a contact angle of water is 90 degrees or more and a contact angle of oleic acid is 70 degrees or more. In the measurement, the contact angle of a 1 μmL droplet is measured under a condition within a range of 20±10° C., using a contact angle meter (for example, DM-701 manufactured by Kyowa Interface Science Co., Ltd.). The measurement is conducted at different five places on the surface of the antifouling film, and an average value of the measured values is calculated and defined as the contact angle on the surface of the antifouling film.

(Skewness Rsk of the Roughness Curve and an Average Length Rsm of Elements of the Roughness Curve)

In the transparent substrate with an antifouling film, skewness Rsk of the roughness curve measured on the surface of the antifouling film is preferably −1.5 to 1.5 and more preferably −1.0 to 1.0. Here, the skewness Rsk of the roughness curve expresses a cubic mean of a height Z(x) in a reference length rendered dimensionless by the cube of a root mean square height (Zq), and is an index indicating a deviation from a mean line of a rugged shape. When a value of the skewness Rsk of the roughness curve is plus (Rsk>0), the rugged shape is deviated toward a depression side and a projecting shape tends to be sharp, and when it is minus (Rsk<0), the rugged shape is deviated toward a projection side and the projecting shape tends to be blunt. As the projecting shape of the roughness curve is blunter, haze is lower than when the projecting shape is sharp.

When the skewness Rsk of the roughness curve is within the aforesaid range, the contact area on the surface of the antifouling film in the transparent substrate with an antifouling film can be more suitable. Further, it is easier to achieve both a high antiglare property on the surface of the antifouling film of the transparent substrate with an antifouling film and low haze of the transparent substrate with an antifouling film.

In the transparent substrate with an antifouling film, an average length Rsm of elements of the roughness curve measured on the surface of the antifouling film is preferably not less than 10 µm nor more than 18 µm. This is because, when the average length Rsm of the elements of the roughness curve on the surface of the antifouling film is too large, the haze of the transparent substrate with an antifouling film and a glare index value (Sparkle) on the surface of the antifouling film of the transparent substrate with an antifouling film are likely to be large, and when it is too small, the antiglare property on the surface of the antifouling film is likely to be lower.

The "skewness Rsk of the roughness curve" and the "average length Rsm of the elements of the roughness curve" can be measured according to the methods stipulated in JIS B0601-2001, JIS B0632-2001, JIS B0633-2001, and JIS B0651-2001 using SURFCOM1500 SD3-12 manufactured by Tokyo Seimitsu Co., Ltd. In the measurement, a stylus having a 2 µm tip radius and having a 60-degree conical taper angle is used.

(Haze)

The haze of the transparent substrate with an antifouling film is preferably 0.1 to 15.0%, more preferably 0.2 to 10.0%, and especially preferably 0.5 to 5.0%. When the haze is equal to the lower limit value or more in the above range, the antiglare property is more excellent. When the haze is equal to the upper limit value or less in the above range, image visibility is unlikely to be impaired when the transparent substrate with an antifouling film is disposed on a display surface of an image display device.

The "haze" is measured by the method described in JIS K7136:2000 (ISO 14782:1999).

(Glossiness)

Gloss measured on the surface of the antifouling film in the transparent substrate with an antifouling film is preferably 140% or less, more preferably 135% or less, and still more preferably 130% or less in terms of 60° specular glossiness (%) (Gloss). The 60° specular glossiness on a surface having a rugged shape is an index of an antiglare effect. When the 60° specular glossiness is equal to the aforesaid upper limit value or less, a sufficient antiglare effect is exhibited.

The 60° specular glossiness on the surface of the antifouling film of the transparent substrate with an antifouling film is a value which is measured at a substantially center portion of the plane of the antifouling film, with a black felt laid on the rear surface side to eliminate rear surface reflection of the transparent substrate with an antifouling film, by, for example, the method stipulated in the 60° specular glossiness of JIS Z8741:1997 using an all-in-one gloss meter (Rhopoint IQ manufactured by Rhopoint Instruments). Note that, in the above, the rear surface of the transparent substrate with an antifouling film refers to a surface, of the transparent substrate with an antifouling film, on a side not having the antifouling film.

(Antiglare Property Index Value (Diffusion))

An antiglare property index value (Diffusion) on the surface of the antifouling film of the transparent substrate with an antifouling film is preferably 0.1 or more and more preferably 0.2 or more. The antifouling film whose surface has the antiglare property index of 0.1 or more exhibits an excellent antiglare property when used in an image display device.

The antiglare property index value on the surface of the antifouling film of the transparent substrate with an antifouling film can be measured in the following procedure using a variable angle photometer GC5000L manufactured by Nippon Denshoku Industries Co., Ltd. First, with an angle in a direction parallel to a thickness direction of the transparent substrate with an antifouling film being defined as 0°, a first light is irradiated in a direction of an angle θ=−45°±0.5° (hereinafter also referred to as a "−45° angle direction") from an antifouling film surface side of the transparent substrate with an antifouling film. The first light is reflected on the surface of the antifouling film of the transparent substrate with an antifouling film. A 45° reflected light reflected in a direction of an angle θ'=45° from the surface of the antifouling film of the transparent substrate with an antifouling film is received and its luminance is measured, which is defined as a "luminance of the 45° reflected light".

Next, lights reflected from the surface of the antifouling film of the transparent substrate with an antifouling film are received, with the reflection angle θ' being varied within a range of 5° to 85°, and the same operation is executed. Consequently, a luminance distribution of the reflected lights reflected on the surface of the antifouling film of the transparent substrate with an antifouling film and received in the range of 5° to 85° is measured and the total luminance is defined as a "luminance of all the reflected lights".

Next, from the following expression (I), the antiglare property index value (Diffusion) is calculated.

Antiglare property index value=((luminance of all the reflected lights−luminance of 45° reflected light)/(luminance of all the reflected lights))　　　Expression (I)

It has been confirmed that the antiglare property index value correlates with the visual determination result of the antiglare property by an observer and shows a behavior close to a visual sense of a person. A smaller antiglare property index value (close to 0) can be evaluated as a poorer antiglare property, and a larger antiglare property index value can be evaluated as a better antiglare property.

(Glare Index Value (Sparkle))

The glare index value (Sparkle) on the surface of the antifouling film of the transparent substrate with an antifouling film is preferably 90 or less. The glare index value can be measured using EyeScale ISC-A manufactured by I System Corporation while the transparent substrate with an antifouling film is placed on a display surface of a liquid crystal display with the surface of the antifouling film facing up. The larger glare index value indicates larger glare.

As described in the aforesaid characteristic (1), the surface shape of the antifouling film is not formed by the antifouling film itself, and is obtained from the reflection of the surface shape of the antifouling film side of the member located more on the transparent substrate side than the antifouling film. That is, it is possible to adjust the arithmetic mean roughness Rs, the skewness Rsk of the roughness curve, and the average length Rsm of the elements of the roughness curve on the surface of the antifouling film, by disposing, for example, the antiglare layer on the transparent substrate side of the antifouling film and adjusting the shape of the antifouling film-side main surface of the antiglare layer or by adjusting the shape of the antifouling film-side main surface of the transparent substrate.

The haze, the 60° specular glossiness, the antiglare property index value, and the glare index value of the transparent substrate with an antifouling film can be adjusted by the skewness Rsk of the roughness curve, the arithmetic mean roughness Ra, the average length Rsm of the elements of the roughness curve, and the like on the surface of the antifouling film as described above.

The transparent substrate with an antifouling film of the embodiment has the antifouling film as the outermost layer on one main surface of the transparent substrate, and by having, for example, the following structure (A), (B), or (C), can have the characteristics (1) and (2).

(A) A structure where it has a conductive antiglare layer having conductivity between the transparent substrate and the antifouling film, and an antifouling film-side main surface of the conductive antiglare layer is configured to diffusely reflect an incident light. Hereinafter, a transparent substrate with an antifouling film having the structure (A) will be also referred to as a transparent substrate with an antifouling film (A).

(B) A structure where it has a conductive layer and an antiglare layer between the transparent substrate and the antifouling film, and an antifouling film-side main surface of the antiglare layer is configured to diffusely reflect an incident light. Hereinafter, a transparent substrate with an antifouling film having the structure (B) will also be referred to as a transparent substrate with an antifouling film (B). In the transparent substrate with an antifouling film (B), the conductive layer and the antiglare layer which are provided between the transparent substrate and the antifouling film may be provided in the order of the conductive layer and the antiglare layer or in the order of the antiglare layer and the conductive layer, from the transparent substrate side.

(C) A structure where it has a conductive layer between the transparent substrate and the antifouling film, and an antifouling film-side main surface of the transparent substrate is configured to diffusely reflect an incident light. Hereinafter, a transparent substrate with an antifouling film having the structure (C) will also be referred to as a transparent substrate with an antifouling film (C).

Hereinafter, the transparent substrate with an antifouling film (A), the transparent substrate with an antifouling film (B), and the transparent substrate with an antifouling film (C) will be described with reference to the drawings.

(Transparent Substrate with Antifouling Film (A))

Figure 2:
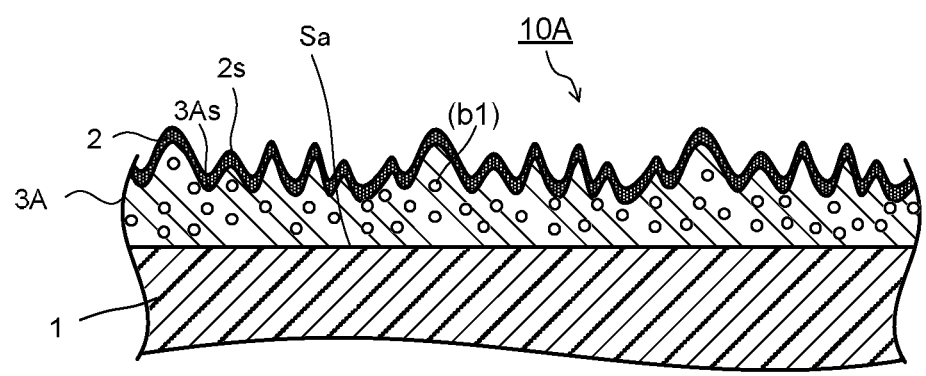
FIG. 2 is an enlarged sectional view of the transparent substrate with an antifouling film illustrated in FIG. 1.

FIG. 1 is a view schematically illustrating a cross section of an example of the transparent substrate with an antifouling film (A) of an embodiment. FIG. 2 illustrates an enlarged sectional view of the transparent substrate with an antifouling film illustrated in FIG. 1. A transparent substrate with an antifouling film 10A illustrated in FIG. 1 has a transparent substrate 1, a conductive antiglare layer 3A provided on the transparent substrate 1 and having conductivity, and an antifouling film 2 provided on the conductive antiglare layer 3A. The antifouling film 2 constitutes an outermost layer on one main surface Sa of the transparent substrate 1.

Here, a surface 2s of the antifouling film 2 is one surface of the transparent substrate with an antifouling film 10A, and in the description below, the antifouling film 2-side surface of the transparent substrate with an antifouling film 10A will also be referred to as the surface 2s of the transparent substrate with an antifouling film 10A. Hereinafter, the constituent elements of the transparent substrate with an antifouling film 10A will be described.

<Transparent Substrate>

The transparent substrate 1 is not limited as long as it is made of a transparent material that transmits at least a visible light and is in a plate shape having two opposed main surfaces Sa, Sb. Examples of the material forming the transparent substrate 1 include glass, resin, and a combination of these (a composite material, a layered material, or the like). Examples of the glass include soda-lime glass, borosilicate glass, aluminosilicate glass, phosphoric acid-based glass, and alkali-free glass. Examples of the resin include polyethylene terephthalate, polycarbonate, triacetylcellulose, and polymethyl methacrylate.

In the transparent substrate 1, the main surface Sa on which the conductive antiglare layer 3A is formed may be smooth or may be rugged. From a viewpoint of the advantage in providing the conductive antiglare layer 3A, the main surface Sa is preferably smooth. Incidentally, the conductive antiglare layer 3A provided on the transparent substrate 1 need not be formed all over the main surface Sa of the transparent substrate 1. The conductive antiglare layer 3A is preferably formed in a region where the antifouling film 2 is formed, that is, at least in a region where a finger touch operation is made in the use as a touch panel.

The shape of the main surfaces Sa, Sb of the transparent substrate 1 is not limited to the flat shape as illustrated but may be a shape having a curved surface. In this case, the whole surfaces may be the curved surfaces or the surfaces Sa, Sb may each include a curved part and a flat part. In various kinds of devices (television sets, personal computers, smartphones, car navigation systems, and so on) including an image display device, there has recently appeared an image display device having a curved display surface. The transparent substrate with an antifouling film 10A in which the main surfaces Sa, Sb of the transparent substrate 1 have a curved shape is useful when used in such an image display device.

As the transparent substrate 1, a glass substrate is preferable from a viewpoint of transparency, mechanical strength, and the like. A method of producing the glass substrate is not limited. It is possible to produce the glass substrate by supplying a desired glass raw material into a melting furnace, melting it by heating to fine it, and thereafter supplying the molten glass to a shaping device to shape it, followed by annealing. It should be noted that a shaping method of the glass substrate is not limited, and for example, a glass substrate shaped by a float method, a fusion method, a down-draw method, or the like is usable.

The thickness of the transparent substrate 1 can be appropriately selected according to its use. For example, in the case where a glass substrate is used as the transparent substrate 1, its thickness is preferably 0.1 to 5 mm and more preferably 0.2 to 2.5 mm.

In the case where the glass substrate is used as the transparent substrate 1, the glass substrate preferably has a strengthened main surface. The strengthening improves the strength of the glass, making it possible to reduce the thickness while maintaining the strength, for instance.

The transparent substrate with an antifouling film 10A may have functional layers such as an undercoat layer, an adhesive layer, and a protective layer between the transparent substrate 1 and the conductive antiglare layer 3A. The undercoat layer has a function as an alkali barrier layer or a wide-band low-refractive-index layer. The undercoat layer is preferably a layer formed by the application of an undercoat layer-forming composition containing a hydrolysate (sol-gel silica) of alkoxysilane on the transparent substrate 1.

<Conductive Antiglare Layer>

The conductive antiglare layer 3A has conductivity and in addition, an antifouling film 2-side main surface 3As of the conductive antiglare layer 3A is configured to diffusely reflect an incident light.

Surface resistivity measured on the antifouling film 2-side main surface 3As of the conductive antiglare layer 3A is preferably $1.0 \times 10^{10}$ to $1.0 \times 10^{13} \Omega/$ and more preferably $1.0 \times 10^{10}$ to $1.0 \times 10^{12} \Omega/$, though depending on the constituent material and thickness of the antifouling film 2. Owing to the aforesaid conductivity that the conductive antiglare layer 3A has, the surface resistivity measured on the surface 2s of the antifouling film 2 in the transparent substrate with an antifouling film 10A can fall within the aforesaid predetermined range.

The shape of the antifouling film 2-side main surface 3As of the conductive antiglare layer 3A is, for example, a rugged shape whose arithmetic mean roughness Rs is 0.01 µm or more. The arithmetic mean roughness Ra of the main surface 3As is preferably within the aforesaid range which is described as the preferable range of the arithmetic mean roughness Ra on the surface of the antifouling film. Skewness Rsk of a roughness curve, an average length Rsm of elements of the roughness curve, 60° specular glossiness, an antiglare property index value, and a glare index value on the antifouling film 2-side main surface 3As of the conductive antiglare layer 3A are preferably within the aforesaid ranges which are described as the preferable ranges of these physical properties on the surface 2s of the antifouling film 2.

The conductive antiglare layer 3A preferably has an average film thickness of 15 to 1500 nm. When the average film thickness of the conductive antiglare layer 3A is 15 to 50 nm, the haze and the glare index value are easily decreased. The average film thickness of the conductive antiglare layer 3A is more preferably 50 nm or more because this can impart a sufficient antiglare property to the transparent substrate with an antifouling film 10A. The average film thickness of the conductive antiglare layer 3A is preferably 1500 nm or less because this enables to easily attain optical properties such as the antiglare property index value and the haze within favorable ranges.

Here, it is possible to measure the average film thickness of the conductive antiglare layer 3A by processing a cross section of the conductive antiglare layer 3A by focused ion beams, thereafter observing the cross section at, for example, 10000 magnifications with a scanning microscope (SEM), and measuring the thickness from an interface of the transparent substrate 1 and the conductive antiglare layer 3A up to the front surface of the conductive antiglare layer 3A in the whole photographed range. The film thickness can be calculated using digital data photographed by SEM or image processing software.

The conductive antiglare layer 3A may be formed to cover the whole main surface Sa of the transparent substrate 1, leaving no space. Alternatively, part of the main surface Sa of the transparent substrate 1 may be exposed without the conductive antiglare layer 3A formed thereon. Specifically, the conductive antiglare layer 3A may be formed in an island shape. When the thickness of the conductive antiglare layer 3A is, for example, 300 nm or less, the conductive antiglare layer 3A is sometimes formed discontinuously on the main surface of the transparent substrate 1, resulting in the exposure of part of the main surface of the transparent substrate 1.

The rugged shape of the main surface 3As of the conductive antiglare layer 3A may be, for example, a shape having first projections each having a root portion with a 1 µm diameter or more and second projections each having a root portion with a diameter of less than 1 µm. Further, there may be overlapping between the first projections, between the second projections, or between the first projection and the second projection. Such a surface structure can be observed through an analysis of laser microscope measurement data by image processing software.

It is possible to form the conductive antiglare layer 3A by, for example, applying a conductive antiglare layer-forming liquid composition (hereinafter, a liquid composition (X1)) on the main surface Sa of the transparent substrate 1 and curing the liquid composition (X1). The film thickness of the conductive antiglare layer 3A, and the surface resistivity, the arithmetic mean roughness Ra, the skewness Rsk of the roughness curve, and the average length Rsm of the elements of the roughness curve on the antifouling film 2-side main surface 3As can be adjusted by the composition of the liquid composition (X1) used for the formation of the conductive antiglare layer 3A, an application condition of the liquid composition (X1) on the transparent substrate 1, and so on.

A material forming the conductive antiglare layer 3A is preferably, for example, a material containing a binder whose main component is silica and a conductive agent such as conductive fine particles. Note that "whose main component is silica" means that 50% by mass or more of $SiO_2$ is contained. The conductive antiglare layer 3A using the binder whose main component is silica is excellent in chemical stability, adhesion with the substrate when the transparent substrate is a glass substrate, and abrasion resistance.

A ratio of the binder and the conductive agent in the conductive antiglare layer 3A can be appropriately adjusted to 90:10 to 10:90 in terms of a mass ratio of the binder:the conductive agent.

The liquid composition (X1) for forming the conductive antiglare layer 3A made of the material containing the binder whose main component is silica and the conductive agent is, for example, a composition containing a silica precursor (a), a conductive agent (b), and a liquid medium (c), and optionally containing particles (d) (hereinafter, other particles (d)) other than conductive fine particles (b1) (to be described later) in the conductive agent (b).

(Silica Precursor (a))

The "silica precursor" means a substance that can form a matrix whose main component is silica, by a siloxane bond or the like. As the silica precursor (a), a silane compound such as alkoxysilane, its hydrolyzed condensate, and the like which are well known are appropriately usable. As the silica precursor (a), one kind may be used alone, or two kinds or more may be used in combination.

The silica precursor (a) preferably contains one or both of alkoxysilane having carbon atoms directly bonded with silicon atoms and its hydrolyzed condensate, from a viewpoint of preventing the conductive antiglare layer 3A from cracking and peeling. Further, the silica precursor (a) preferably contains one or both of tetraalkoxysilane and its hydrolyzed condensate, from a viewpoint of wear resistance of the conductive antiglare layer 3A.

The content of the silica precursor (a) in the liquid composition (X1) is preferably 30 to 90% by mass and more preferably 40 to 90% by mass in terms of $SiO_2$ to the total amount of a solid content. The solid content of the liquid composition (X1) is the sum of the contents of all the components in the liquid composition (X1) except a component such as the liquid medium (c) that disappears in the formation process of the conductive antiglare layer 3A, and the content of the silica precursor (a) is in terms of $SiO_2$ as described above.

(Conductive Agent (b))

Examples of the conductive agent (b) include ion conduction-type conductive agents such as quaternary ammonium salt and lithium salt, and electron conduction-type conductive agents such as metal fine particles, metal oxide fine particles, carbon nanotube, coating fine particles, and polyethylene dioxythiophene-based particles. Out of them, the electron conduction-type conductive agents are suitably used, because they are not susceptible to humidity. Further, among the electron conduction-type conductive agents, the metal oxide fine particles are preferable in view of their good long-term storage, heat resistance, moist-heat resistance, and light resistance. The electron conduction-type conductive agent will be hereinafter referred to as "conductive fine particles (b1)".

Note that, in FIG. 2, a case where the conductive fine particles (b1) are used as the conductive agent (b) in the conductive antiglare layer 3A is schematically illustrated.

Metal forming the metal fine particles is not limited, and examples thereof include Au, Ag, Cu, Al, Fe, Ni, Pd, Pt, Ru, and an alloy of these.

A metal oxide forming the metal oxide fine particles is not limited, and examples thereof include tin oxide ($SnO_2$), antimony oxide ($Sb_2O_5$), antimony-doped tin oxide (ATO), antimony-doped titanium oxide, indium-doped tin oxide (ITO), phosphorus-doped tin oxide, aluminum-doped zinc oxide (AZO), fluorinated tin oxide (FTO), antimony-doped zinc oxide, and zinc oxide (ZnO).

The coating fine particles are not limited, and examples thereof include conventionally known fine particles having a structure in which conductive coating layers are formed on the surfaces of core fine particles. The core fine particles are not limited, and examples thereof include inorganic fine particles such as colloidal silica fine particles, polymer fine particles such as fluorocarbon resin fine particles, acrylic resin fine particle, and silicone resin fine particles, and fine particles of organic-inorganic composite particles. Further, a material forming the conductive coating layer is not limited, and examples thereof include the aforesaid metals and metal oxides.

The shape of the conductive fine particles (b 1) is not limited and examples thereof include a spherical shape, a scaly shape, a rod shape, a chain shape, and an acicular shape. These shapes may be formed by primary particles themselves, or may be formed by secondary particles which are aggregated, layered, or connected primary particles. Note that the "scaly shape" means a flat shape. The shape of the conductive fine particles (b1) can be confirmed using a transmission electron microscope (hereinafter, also referred to as TEM).

An average particle size of the primary particles of the conductive fine particles (b1) is preferably 2 to 150 nm and more preferably 3 to 100 nm from a viewpoint of ensuring transparency and ensuring conductivity.

Note that, in the present specification, the average particles size of particles means a particle size at a 50% point in a cumulative volume distribution curve, with the total volume of a volume-based particle size distribution being defined as 100%, that is, a volume-based cumulative 50% diameter (D50). The particle size distribution can be found in frequency distribution and cumulative volume distribution curve measured by a laser diffraction scattering type particle size distribution analyzer.

The content of the conductive agent (b) in the conductive antiglare layer 3A is, in other words, the content of the conductive agent (b) in the solid content of the liquid composition (X1). In the case where the conductive fine particles (b1) are used as the conductive agent (b), the content of the conductive agent (b) is adjusted according to the kind, shape, size, and so on of the conductive fine particles (b1) used, and for example, is a content of 10 to 80% by mass and more preferably 30 to 80% by mass to the total amount of the conductive antiglare layer 3A.

In order to have sufficient dispersibility in the liquid composition (X1), the conductive fine particles (b1) are preferably compounded in the liquid composition (X1) while in a state of a dispersion which is prepared by dispersing the conductive fine particles (b1) in a dispersion medium in advance using a bead mill or the like. In this case, since the dispersion medium constitutes part of the following liquid medium (c), a compound similar to or having compatibility with the liquid medium (c) is preferably used as the dispersion medium. Incidentally, when the dispersion of the conductive fine particles (b1) is prepared, a dispersing agent may be used. Further, since the conductive fine particles (b1) are available on the market as a dispersion, such a commercially available product may be compounded in the liquid composition (X1).

(Liquid Medium (c))

The liquid medium (c) in which the silica precursor (a) is dissolved or dispersed and the conductive fine particles (b1) and the other particles (d) are dispersed, is preferably used. The liquid medium (c) may have both a function as a solvent or a dispersion medium of having the silica precursor (a) dissolved or dispersed therein and a function as a dispersion medium of having the conductive fine particles (b1) and the other particles (d) dispersed therein.

The liquid medium (c) preferably contains at least a liquid medium (c1) whose boiling point is 150° C. or lower. The boiling point of the liquid medium (c1) is preferably 50 to 145° C. and more preferably 55 to 140° C. When the boiling point of the liquid medium (c1) is within the above preferable range, in a case where the conductive antiglare layer 3A is formed by applying the liquid composition (X1) on the main surface Sa of the transparent substrate 1 using an electrostatic coater including an electrostatic coating gun having a rotary atomizing head, followed by burning, the surface shape of the obtained conductive antiglare layer A can easily be the rugged shape having the aforesaid characteristics.

Since water is necessary for hydrolyzing the alkoxysilane and so on in the silica precursor (a), the liquid medium (c) contains at least water as the liquid medium (c1) unless the liquid medium is replaced after the hydrolysis. The liquid medium (c) may further contain a liquid medium other than the liquid medium (c1), that is, may further contain a liquid medium (c2) whose boiling point is over 150° C. as required.

The content of the liquid medium (c) in the liquid composition (X1) is an amount according to the solid content concentration of the liquid composition (X1). The solid content concentration of the liquid composition (X1) to the total amount (100% by mass) of the liquid composition (X1) is preferably 0.05 to 2% by mass and more preferably 0.1 to 1% by mass. When the solid content concentration is equal to the lower limit value or more in the aforesaid range, it is possible to reduce a liquid volume of the liquid composition (X1). When the solid content concentration is equal to the upper limit value or less in the aforesaid range, the rugged structure having the second projections can be easily formed. Further, the uniformity of the film thickness of the conductive antiglare layer 3A improves.

The content of the liquid medium (c1) to the total amount of the liquid medium (c) is preferably 86% by mass or more and more preferably 90% by mass or more. The content of the liquid medium (c1) may be 100% by mass to the total amount of the liquid medium (c).

The liquid medium (c2), if contained, makes it possible to reduce the skewness Rsk of the roughness curve of the obtained conductive antiglare layer 3A and facilitates achieving both an excellent antiglare property and low haze. In the case where the liquid medium (c) contains the liquid medium (c2), a content ratio of the liquid medium (c2) to the total amount of the liquid medium (c) is preferably 0.01 to 14% by mass.

(Other Particles (d))

The liquid composition (X1) for forming the conductive antiglare layer 3A may contain the other particles (d) as required. The other particles (d), if contained in the liquid composition (X1), makes it possible for the obtained conductive antiglare layer 3A to easily have the rugged surface shape having the aforesaid characteristics.

In a case where the constituent material of the conductive antiglare layer 3A contains silica as its main component, the other particles (d) are preferably silica particles such as spherical silica particles, scaly silica particles, rod-shaped silica particles, or acicular silica particles because they can inhibit a refractive index increase and lower a reflectance of the film. From a viewpoint of easily obtaining a lower haze ratio, the spherical silica particles are preferable. From a viewpoint of obtaining an antiglare effect only with a small amount and from a viewpoint of preventing the conductive antiglare layer 3A from cracking and peeling, the scaly silica particles are preferable.

As the scaly silica particles, commercially available ones may be used or produced ones may be used. As the scaly silica particles, a powder may be used, or a dispersion in which they are dispersed in a dispersion medium may be used. Examples of a commercially available product of the scaly silica particles include SUNLOVELY (registered trademark) series manufactured by AGC Si-Tech Co., Ltd.

The content of the other particles (d) in the liquid composition (X1) in terms of a ratio of the other particles (d) to the total mass (100% by mass) of the silica precursor (a) and the other particles (d) (the mass of the silica precursor (a) is in terms of $SiO_2$) is preferably 0 to 40% by mass and more preferably 0 to 30% by mass. When the content of the other particles (d) is equal to the upper limit value or less in the aforesaid range, adhesion with the transparent substrate 1 is excellent.

In a case where the other particles (d) are the spherical silica particles, a ratio of the other particles (d) to the total mass (100% by mass) of the silica precursor (a) and the other particles (d) is preferably 1 to 40% by mass and more preferably 2 to 30% by mass.

In a case where the other particles (d) are the scaly silica particles, a ratio of the other particles (d) to the total mass (100% by mass) of the silica precursor (a) and the other particles (d) is preferably 0.5 to 30% by mass and more preferably 1 to 20% by mass.

When the ratio of the other particles (d) is equal to the lower limit value or more in the aforesaid range, a low glare property is more excellent. When the ratio of the other particles (d) is equal to the upper limit value or less in the aforesaid range, a lower haze ratio is easily obtained. Further, the silica precursor (a), if contained in a predetermined ratio or more, improves adhesion strength between the conductive antiglare layer 3A and the transparent substrate 1.

(Other Optional Components)

The liquid composition (X1) may contain, besides the above-described components, another binder (f) except the silica precursor (a) (hereinafter, "other binder (f)"), an additive (g), and so on. Examples of the other binder (f) include an inorganic substance and a resin dissolved or dispersed in the liquid medium (c). Examples of the inorganic substance include precursors of metal oxides other than silica, for example, titania, zirconia, and so on. Examples of the resin include a thermoplastic resin, a thermosetting resin, an ultraviolet curable resin.

Examples of the additive (g) include a dispersing agent for inhibiting the conductive fine particles (b1) and the other particles (d) from aggregating in the liquid composition (X1), an ultraviolet absorbent, an infrared reflecting agent, an infrared absorbent, a reflection inhibitor, a surfactant for improving a leveling property, and a metal compound for improving durability.

Examples of the dispersing agent include an unsaturated carboxylic acid polymer, a cellulose derivative, an organic acid (excluding an unsaturated carboxylic acid polymer), and a terpene compound. As the dispersing agent, one kind may be used alone, or two kinds or more may be used in combination.

(Formation of the Conductive Antiglare Layer)

(1) Preparation and Application of the Liquid Composition (X1)

The liquid composition (X1) can be prepared by mixing the above-described components. The viscosity of the liquid composition (X1) at an applying temperature (hereinafter, also referred to as "liquid viscosity") is preferably 0.003 Pa·s or less and especially preferably 0.001 to 0.003 Pa·s. When the liquid viscosity is equal to the aforesaid upper limit value or less, droplets formed when the liquid composition (X1) is sprayed become finer, facilitating forming the conductive antiglare layer 3A having the desired surface shape. When the liquid viscosity is equal to the aforesaid lower limit value or more, the rugged shape of the surface of the conductive antiglare layer 3A becomes uniform. The viscosity of the liquid composition (X1) is a value measured by a B-type viscometer.

The liquid composition (X1) prepared in this manner is applied on the main surface Sa of the transparent substrate 1 by a spray coating method. The liquid composition (X1) can be applied on the transparent substrate 1 by, for example, charging and spraying the liquid composition (X1) using an electrostatic coater including an electrostatic coating gun having a rotary atomizing head. Consequently, an applied film of the liquid composition (X1) is formed on the main surface Sa of the transparent substrate 1. The electrostatic coater includes the electrostatic coating gun which includes a gun main body and the rotary atomizing head, and rotary-drives the rotary atomizing head to atomize and discharge the liquid composition (X1), which is supplied to the rotary atomizing head, by a centrifugal force, thereby spraying the liquid composition (X1) toward the main surface Sa of the transparent substrate 1.

As the electrostatic coater, a well-known electrostatic coaler is adoptable as long as it includes an electrostatic coating gun having a rotary atomizing head. As the electrostatic coating gun, a well-known electrostatic coating gun is adoptable as long as it has a rotary atomizing head. It should be noted that an applying means of the liquid composition (X1) is not limited to the aforesaid electrostatic coater, and a well-known application means is usable.

(2) Burning

Next, the applied film of the liquid composition (X1) formed on the main surface Sa of the transparent substrate 1 is burned. Consequently, a volatile component such as the liquid medium (c) in the applied film volatilizes to be removed, and the conversion of the silica precursor (a) in the applied film into silica progresses (for example, in a case where the silica precursor (a) is a silane compound having a hydrolyzable group bonded with a silicon atom, the hydrolyzable group almost decomposes and the condensation of a hydrolysate progresses) and in addition, the film is densified, so that the conductive antiglare layer 3A is formed.

The burning may be performed by heating the transparent substrate 1 simultaneously with the application of the liquid composition (X1) on the transparent substrate 1, or may be performed by heating the applied film after the liquid composition (X1) is applied on the transparent substrate 1. A burning temperature is preferably 30° C. or higher, and for example, in a case where the transparent substrate 1 is glass, the burning temperature is preferably 100 to 750° C. and more preferably 150 to 550° C.

According to the production method of the embodiment described above, by spraying the liquid composition (X1) using, preferably, the electrostatic coater including the rotary atomizing head, it is possible to form the conductive antiglare layer 3A whose antifouling film 2-side main surface 3As has the desired surface shape. A possible reason for this is that, as compared with a case where a spray method conventionally in wide use (for example, a method using, in particular, a two-fluid nozzle) other than the electrostatic coater is employed, the droplets of the liquid composition (X1) adhere on the transparent substrate 1 at a slower speed, and the liquid medium (c) in the adhering droplets more quickly volatilize, so that the droplets do not easily spread on the transparent substrate 1 and can be formed into the film while maintaining the shape at the time of the adhesion.

Further, in the production method of the embodiment described above, it is possible to control the surface shape of the main surface 3As of the formed conductive antiglare layer 3A by the viscosity, the application condition, the burning temperature, and so on of the liquid composition (X1).

<Antifouling Film>

The antifouling film 2 is a layer located on one outermost layer of the transparent substrate with an antifouling film 10A and having water and oil repellency. The antifouling film 2 is formed on the main surface 3As of the conductive antiglare layer 3A and has the surface 2s whose shape follows the shape of the main surface 3As. Arithmetic mean roughness Ra is 0.01 μm or more and surface resistivity is $1.0 \times 10^9$ to $1.0 \times 10^{13} \Omega/$, as measured on the surface 2s of the antifouling film 2. Preferable values of the various indexes indicating the arithmetic mean roughness Ra, the surface resistivity, and the surface shape on the surface 2s of the antifouling film 2 are as described above.

As for the water and oil repellency of the antifouling film 2, it is preferable that the contact angle of water is 90 degrees more and the contact angle of oleic acid is 70 degrees or more as described above. Having the water and oil repellency, the antifouling film 2 has an antifouling property and a good finger slip property. Examples of the antifouling film 2 include an AFP (Anti Finger Print) layer.

The antifouling film 2 is preferably made of a fluorine-containing organic silicon compound coating film that is obtained by, for example, curing a fluorine-containing organic silicon compound through a hydrolysis and condensation reaction.

In a case where, for example, the antifouling film 2 is made of the fluorine-containing organic silicon compound coating film, the thickness of the antifouling film 2 is preferably 2 to 30 nm and more preferably 5 to 20 nm. The antifouling film 2 having a film thickness of 2 nm or more is excellent not only in the antifouling property but also in abrasion resistance. Further, such an antifouling film 2 exhibits sufficient water and oil repellency and have a good finger slip property on its surface. The antifouling film 2 having a film thickness of 30 nm or less is preferable because it can have the surface 2s whose shape fully follows the shape of the main surface 3As of the conductive antiglare layer 3A.

Note that the shape of the main surface 3As of the conductive antiglare layer 3A and the surface shape of the surface 2s of the antifouling film 2 need not be strictly identical as long as the surface shape on the surface 2s of the antifouling film 2 has at least the rugged shape whose arithmetic mean roughness Ra is 0.01 μm or more, and preferably has the aforesaid characteristics of the surface shape.

The thickness of the antifouling film 2 can be calculated, for example, from a vibration period of a reflected X-ray interference pattern which is obtained by an X-ray reflectivity method using a thin film analysis X-ray diffractometer ATX-G (manufactured by RIGAKU Corporation). Another method to find the thickness of the antifouling film 2 is to prepare an antireflection film whose reflection spectrum is measured in advance, and calculate the film thickness from a reflection spectrum after the antifouling film 2 is formed under the same condition as that for the sample for the thickness measurement of the antifouling film 2 and from a refractive index of the antifouling film 2.

A method of forming the antifouling film 2 will be described, taking the case where the fluorine-containing organic silicon compound coating film is used as the antifouling film 2, as an example.

A method of forming the fluorine-containing organic silicon compound coating film is, for example, a method in which a composition containing the fluorine-containing organic silicon compound having a fluoroalkyl group such as a perfluoroalkyl group or a fluoroalkyl group including a perfluoro (polyoxyalkylene) chain is applied on the main surface 3As of the conductive antiglare layer 3A by a spin coating method, a dip coating method, a casting method, a slit coating method, a spray coating method, or the like, followed by heat treatment as required.

Another example of the method is a vacuum deposition method which vapor-deposits the fluorine-containing organic silicon compound on the main surface 3As of the conductive antiglare layer 3A, followed by heat treatment as required. In order to obtain a highly adhesive fluorine-containing organic silicon compound coating film, the formation by the vacuum deposition method is preferable. In the formation of the fluorine-containing organic silicon compound coating film by the vacuum deposition method, a coating film-forming composition containing a fluorine-containing hydrolyzable silicon compound is preferably used.

The coating film-forming composition is not limited as long as it is a composition that contains the fluorine-containing hydrolyzable silicon compound and can be formed into the coating film by the vacuum deposition method. The fluorine-containing hydrolyzable silicon compound may contain a partially hydrolyzed condensate or a partially hydrolyzed co-condensate in addition to the compound itself.

Such a coating film-forming composition containing the fluorine-containing hydrolyzable silicon compound is made to adhere onto the main surface 3As of the conductive antiglare layer 3A to undergo a reaction to be formed into a film, whereby the fluorine-containing organic silicon compound coating film is obtained. Incidentally, as a specific vacuum deposition method and a specific reaction condition, conventionally known method, condition and so on are usable.

(Transparent Substrate with Antifouling Film (B))

Regarding the transparent substrate with an antifouling film (B), an example in which the transparent substrate, the conductive layer, the antiglare layer, and the antifouling film are stacked in the order mentioned will be described below with reference to FIG. 3, and an example where the transparent substrate, the antiglare layer, the conductive layer, and the antifouling film are stacked in the order mentioned will be described below with reference to FIG. 4.

Figure 3:
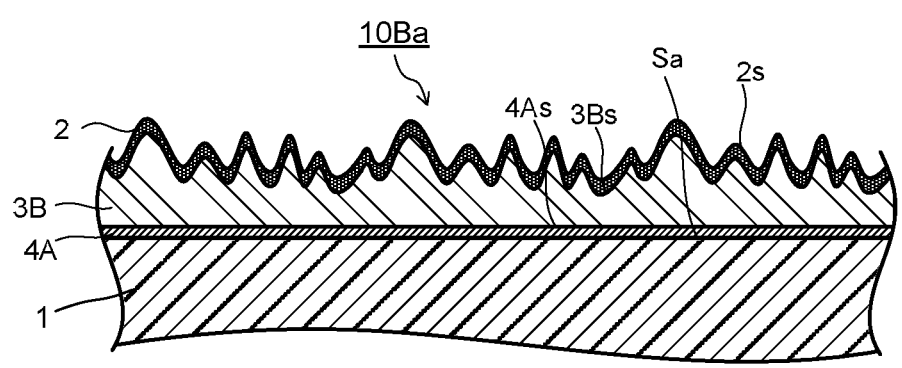
FIG. 3 is an enlarged sectional view of another example of the transparent substrate with an antifouling film according to the embodiment.

FIG. 3 is a view schematically illustrating an enlarged cross section of an example of the transparent substrate with an antifouling film (B) according to an embodiment. A transparent substrate with an antifouling film 10Ba illustrated in FIG. 3 has a transparent substrate 1, a conductive layer 4A provided on the transparent substrate 1, an antiglare layer 3B provided on the conductive layer 4A, and an antifouling film 2 provided on the antiglare layer 3B. The antifouling film 2 constitutes an outermost layer on one main surface Sa of the transparent substrate 1. In the transparent substrate with an antifouling film 10Ba, an antifouling film 2-side main surface 3Bs of the antiglare layer 3B is configured to diffusely reflect an incident light. The constituent elements of the transparent substrate with an antifouling film 10Ba will be described below.

The transparent substrate 1 and the antifouling film 2 in the transparent substrate with an antifouling film 10Ba are the same as the transparent substrate 1 and the antifouling film 2 in the transparent substrate with an antifouling film 10A illustrated in FIGS. 1 and 2.

The antiglare layer 3B in the transparent substrate with an antifouling film 10Ba is the same as the conductive antiglare layer 3A in the transparent substrate with an antifouling film 10A except that they are different in conductivity. For example, the shape of the main surface 3Bs of the antiglare layer 3B is a rugged shape whose arithmetic mean roughness Ra is 0.01 μm or more. In the transparent substrate with an antifouling film 10Ba, the shape of a surface 2s of the antifouling film 2 provided on the antiglare layer 3B follows the shape of the antifouling film 2-side main surface 3Bs of the antiglare layer 3B.

Specifically, the antiglare layer 3B is made of the same constituent materials as those of the conductive antiglare layer 3A except that it does not contain the conductive agent, and the antiglare layer 3B is obtained by being formed in the same shape as that of the conductive antiglare layer 3A. The antiglare layer 3B can be formed using a liquid composition (hereinafter, a liquid composition (X2)) having the same composition as that of the aforesaid liquid composition (X1) which is described above as the liquid composition for forming the conductive antiglare layer 3A except that the conductive agent (b) is not included.

The formation of the antiglare layer 3B is the same as the formation of the conductive antiglare layer 3A except that its formation method is different from the formation method of the conductive antiglare layer 3A in that the liquid composition (X2) is applied not on the main surface Sa of the transparent substrate 1 but on an antifouling film 2-side main surface 4As of the conductive layer 4A formed on the main surface Sa of the transparent substrate 1.

Incidentally, the antiglare layer 3B is a layer that is configured to diffusely reflect the incident light and, it may be a layer having low conductivity that does not enable surface resistivity measured on the surface 2s of the antifouling film 2 to be $1.0 \times 10^{13} \Omega/$ or less in a case where it is used alone, as is enabled by the conductive antiglare layer 3A. That is, the antiglare layer 3B may be a layer containing a conductive agent such as the conductive fine particles (b1) in such an amount as to have the aforesaid low conductivity. In this case, the conductivity of the following conductive layer 4A combined with the antiglare layer 3B is appropriately adjusted such that the surface resistivity measured on the surface 2s of the antifouling film 2 falls within the range of the present invention.

The conductive layer 4A is a conductive layer formed from a conductive layer-forming composition containing a conductive agent as an essential component, and a binder and a diluting solvent which are used as required.

Surface resistivity measured on the antifouling film 2-side main surface 4As of the conductive layer 4A is preferably $1 \times 10^{10}$ to $1 \times 10^{13} \Omega/$ and more preferably $1 \times 10^{10}$ to $1 \times 10^{12} \Omega/$, though depending on the constituent material and thickness of the antiglare layer 3B and the constituent material and thickness of the antifouling film 2. Owing to the above conductivity of the conductive layer 4A, it is possible to make the surface resistivity measured on the surface 2s of the antifouling film 2 fall within the aforesaid predetermined range in the transparent substrate with an antifouling film 10Ba.

The thickness of the conductive layer 4A is preferably such a thickness that the surface resistivity measured on the antifouling film 2-side main surface 4As of the conductive layer 4A becomes the aforesaid value, and specifically, is preferably 10 to 300 nm and more preferably 20 to 200 nm, though depending on the kind of the conductive agent and the content of the conductive agent in the conductive layer 4A. The shape of the main surface 4As of the conductive layer 4A may be smooth or may be rugged. It is preferably smooth from a viewpoint of the advantage of providing the antiglare layer 3B.

Examples of the conductive agent contained in the conductive layer 4A include the same conductive agents as those listed as the conductive agent (b) contained in the conductive antiglare layer 3A, and the conductive fine particles (b1) are preferable.

The conductive layer 4A may be formed only of the conductive agent (b), in particular, only of the conductive fine particles (b1), or may be formed of the conductive agent (b), in particular, the conductive fine particles (b1), and optional components such as the binder. In a case where the conductive layer 4A is formed of the conductive fine particles (b1) and the optional components such as the binder, the content of the conductive fine particles (b1) is appropriately adjusted according to the kind, shape, size, and so on of the conductive fine particles (b1) used. Specifically, in order for the surface resistivity measured on the main surface 4As of the conductive layer 4A to fall within the aforesaid preferable range, the content of the conductive fine particles (b1) is preferably 10 to 90% by mass and more preferably 20 to 80% by mass to the total amount of the conductive layer 4A.

For example, in a case where the conductive layer 4A is formed using the aforesaid conductive layer-forming composition, setting the content of the conductive fine particles (b1) to the total amount of a solid content of the conductive layer-forming composition within the same range as above facilitates making the surface resistivity measured on the main surface 4As of the obtained conductive layer 4A fall within the aforesaid range.

Examples of the binder include silica, a thermoplastic resin, a thermosetting resin composition, and an ionizing radiation-curing resin composition, and an appropriate combination of these is usable. As the binder, silica is preferable. In a case where the binder is silica, the silica is contained as a silica precursor in the conductive layer-forming composition. As the silica precursor, the same ones as those usable as the aforesaid silica precursor (a) are usable, and one of tetraalkoxysilane and its hydrolyzed condensate or a combination of these is preferable. The content of the binder in the conductive layer-forming composition is an amount which together with an amount of the other solid content becomes the rest of the content of the conductive fine particles (b1).

Examples of the diluting solvent used in the conductive layer-forming composition include the same liquid mediums usable as the liquid medium (c) used in the aforesaid liquid composition (X1). The content of the diluting solvent used in the conductive layer-forming composition is an amount according to the solid content concentration of the conductive layer-forming composition. The solid content concentration of the conductive layer-forming composition is preferably 0.1 to 10% by mass and more preferably 1 to 5% by mass to the total amount (100% by mass) of the conductive layer-forming composition.

The conductive layer-forming composition may further contain the same dispersing agent as that optionally contained in the aforesaid liquid composition (X1).

A method of forming the conductive layer 4A on the main surface Sa of the transparent substrate 1 is not limited as long as it is capable of forming the conductive layer 4A having the above-described structure, and a conventionally known method is usable. An example of the method is a method of applying the aforesaid conductive layer-forming composition on the main surface Sa of the transparent substrate 1 by a spin coating method, a dip coating method, a casting method, a slit coating method, or a spray coating method, followed by heat treatment as required. Further, the conductive layer 4A may be formed on the main surface Sa of the transparent substrate 1 by a sputtering method using a sputtering target from which a conductive layer with a desired composition can be obtained.

Figure 4:
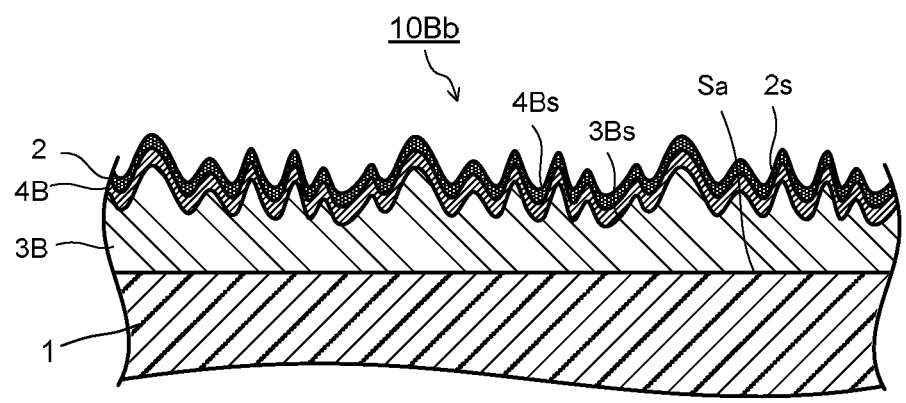
FIG. 4 is an enlarged sectional view of still another example of the transparent substrate with an antifouling film according to the embodiment.

FIG. 4 is a view schematically illustrating an enlarged cross section of another example of the transparent substrate with an antifouling film (B) according to the embodiment. A transparent substrate with an antifouling film 10Bb illustrated in FIG. 4 has a transparent substrate 1, an antiglare layer 3B provided on the transparent substrate 1, a conductive layer 4B provided on the antiglare layer 3B, and an antifouling film 2 provided on the conductive layer 4B. The antifouling film 2 constitutes an outermost layer on one main surface Sa of the transparent substrate 1. In the transparent substrate with an antifouling film 10Bb, an antifouling film 2-side main surface 3Bs of the antiglare layer 3B is configured to diffusely reflect an incident light. The constituent elements of the transparent substrate with an antifouling film 10Bb will be described below.

The transparent substrate 1 and the antifouling film 2 in the transparent substrate with an antifouling film 10Bb are the same as the transparent substrate 1 and the antifouling film 2 in the transparent substrate with an antifouling film 10A illustrated in FIGS. 1 and 2. The antiglare layer 3B in the transparent substrate with an antifouling film 10Bb is the same as the antiglare layer 3B in the transparent substrate with an antifouling film 10Ba illustrated in FIG. 3.

For example, the shape of the main surface 3Bs of the antiglare layer 3B is a rugged shape whose arithmetic mean roughness Ra is 0.01 μm or more. In the transparent substrate with an antifouling film 10Bb, the shape of an antifouling film 2-side main surface 4Bs of the conductive layer 4B provided on the antiglare layer 3B and the shape of the surface 2s of the antifouling film 2 provided on the antifouling film 2-side main surface 4Bs of the conductive layer 4B follow the shape of the antifouling film 2-side main surface 3Bs of the antiglare layer 3B.

In the transparent substrate with an antifouling film 10Bb, surface resistivity measured on the antifouling film 2-side main surface 4Bs of the conductive layer 4B is preferably $1.0 \times 10^9$ to $1.0 \times 10^{13} \Omega/$ and more preferably $1.0 \times 10^{10}$ to $1.0 \times 10^{12} \Omega/$. Typically, the film thickness of an antifouling film is very small, and accordingly the presence or absence of the antifouling film causes almost no difference in a measured value of surface resistivity.

The thickness of the conductive layer 4B is preferably 5 to 200 nm and more preferably 10 to 150 nm in order for the shape of its antifouling film 2-side main surface 4Bs to follow the shape of the antifouling film 2-side main surface 3Bs of the antiglare layer 3B.

The conductive layer 4B in the transparent substrate with an antifouling film 10Bb is the same as the conductive layer 4A in the transparent substrate with an antifouling film 10Ba except that the conductivity and thickness in the conductive layer 4A in the transparent substrate with an antifouling film 10Ba illustrated in FIG. 3 are adjusted to the aforesaid ranges.

The transparent substrate with an antifouling film 10Bb preferably has an adhesive layer between the conductive layer 4B and the antifouling film 2. The adhesive layer is preferably a layer formed by applying an adhesive layer-forming composition containing a hydrolysate (sol-gel silica) of alkoxysilane on the conductive layer 4B.

(Transparent Substrate with Antifouling Film (C))

Figure 5:
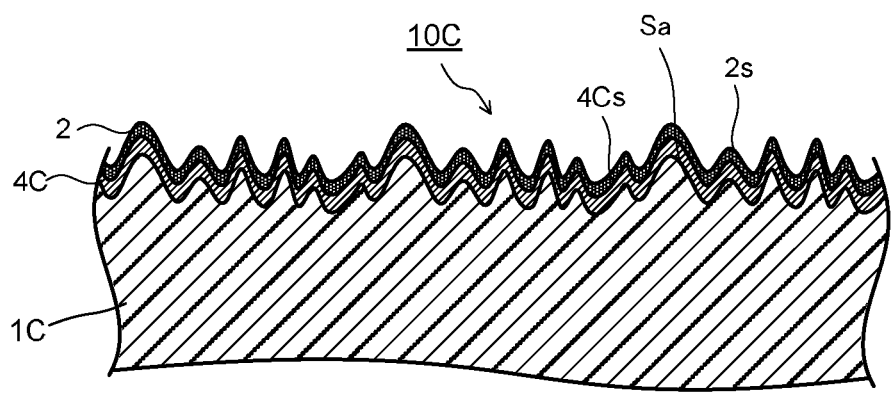
FIG. 5 is an enlarged sectional view of yet another example of the transparent substrate with an antifouling film according to the embodiment.

FIG. 5 is a view schematically illustrating an enlarged cross section of an example of the transparent substrate with an antifouling film (C) according to an embodiment. A transparent substrate with an antifouling film 10C illustrated in FIG. 5 has a transparent substrate 1C, a conductive layer 4C provided on the transparent substrate 1, and an antifouling film 2 provided on the conductive layer 4C. The antifouling film 2 constitutes an outermost layer on one main surface Sa of the transparent substrate 1C. The antifouling film 2-side main surface Sa of the transparent substrate 1C is configured to diffusely reflect an incident light. The constituent elements of the transparent substrate with an antifouling film 10C will be described below.

The antifouling film 2 in the transparent substrate with an antifouling film 10C is the same as the antifouling film 2 in the transparent substrate with an antifouling film 10A illustrated in FIGS. 1 and 2. The conductive layer 4C in the transparent substrate with an antifouling film 10C is the same as the conductive layer 4B in the transparent substrate with an antifouling film 10Bb. The transparent substrate with an antifouling film 10C preferably has the same adhesive layer as that in the transparent substrate with an antifouling film 10Bb between the conductive layer 4C and the antifouling film 2.

The transparent substrate 1C in the transparent substrate with an antifouling film 10C can be the same as the transparent substrate 1 in the transparent substrate with an antifouling film 10A illustrated in FIGS. 1 and 2 except in the structure of its antifouling film 2-side main surface Sa.

The shape of the antifouling film 2-side main surface Sa of the transparent substrate 1C is, for example, a rugged shape whose arithmetic mean roughness Ra is 0.01 μm or more. The arithmetic mean roughness Ra is preferably within the aforesaid range described as the preferable range of the arithmetic mean roughness Ra on the surface of the antifouling film. Skewness Rsk of a roughness curve, an average length Rsm of elements of the roughness curve, 60° specular glossiness, an antiglare property index value, and a glare index value on the antifouling film 2-side main surface Sa of the transparent substrate 1C are preferably within the aforesaid ranges described as the preferable ranges of these physical properties on the surface 2s of the antifouling film 2.

The transparent substrate 1C is obtained by, for example, processing the antifouling film 2-side main surface Sa of the transparent substrate 1 in the transparent substrate with an antifouling film 10A illustrated in FIGS. 1 and 2 into the aforesaid shape. A method of processing the main surface Sa for obtaining the transparent substrate 1C is not limited. The processing method is appropriately selected according to a material and so on of the transparent substrate 1C.

For example, in a case where the transparent substrate 1C is a glass substrate, the method is, for example, a method of frost-treating an untreated transparent substrate which is to be treated (hereinafter, a "substrate to be treated"). The frost treatment can be performed by, for example, immersing the substrate to be treated in a mixed solution of hydrogen fluoride and ammonium fluoride, potassium fluoride, or the like and chemically surface-treating an immersed surface. The content of the hydrogen fluoride in the mixed solution used in the frost treatment is preferably 5 to 60% by mass. Further, in a case where only one main surface of the substrate to be treated is frost-treated, a main surface not to be treated is subjected to pre-treatment such as, for example, pasting an acid-resistant protective film thereon, and thereafter performing the immersion treatment of the substrate to be treated.

Usable methods other than this method by the chemical treatment are, for example, a method by what is called sandblasting which sprays a crystalline silicon dioxide powder, a silicon carbide powder, or the like to the main surface of the substrate to be treated by pressurized air, and a method by physical treatment such as polishing the main surface with a water-moistened brush having a crystalline silicon dioxide powder, a silicon carbide powder, or the like adhering thereon.

In particular, the method of applying the frost treatment which performs the chemical surface treatment using a chemical solution of hydrogen fluoride and so on does not easily cause a microcrack on the surface of the substrate to be treated and does not easily lower mechanical strength, and thus is preferably usable as the method of surface-treating the substrate to be treated.

After the ruggedness is formed on the surface of the substrate to be treated in the above-described manner, the treated surface is typically chemically etched in order to trim the surface shape. This can adjust haze to a desired value according to an etched amount, remove a crack generated due to the sandblasting or the like, and reduce glaring.

As the etching, a method of immersing the substrate to be treated in a solution containing hydrogen fluoride is preferably used. Hydrochloric acid, nitric acid, citric acid, and so on may be contained as components other than the hydrogen fluoride. These contained components can prevent the local occurrence of a precipitation reaction due to a reaction of an alkaline component contained in the glass and the hydrogen fluoride, and can cause the etching to uniformly progress in the plane. The content of the hydrogen fluoride in the solution used in the etching is preferably 5 to 60% by mass.

Hitherto, the transparent substrate with an antifouling film (A), the transparent substrate with an antifouling film (B), and the transparent substrate with an antifouling film (C) have been described as the transparent substrate with an antifouling film of the embodiment of the present invention with reference to FIGS. 1 to 5, but the present invention is not limited to these embodiments, and these embodiments can be changed or modified without departing from the spirit and scope of the present invention.

For example, the transparent substrate with an antifouling film of the embodiment of the present invention may further have layers such as a printed layer, a low-reflection layer, an ultraviolet cut layer, and an infrared cut layer in addition to the above-described structures. As specific examples, a transparent substrate with an antifouling film of an embodiment having the printed layer will be described.

Figure 6A:
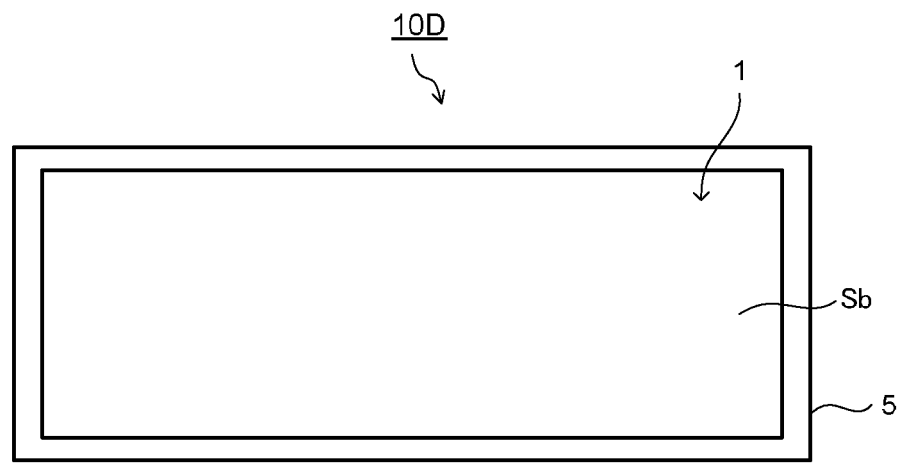
FIG. 6A is a schematic bottom view of yet another example of the transparent substrate with an antifouling film according to the embodiment.
Figure 6B:
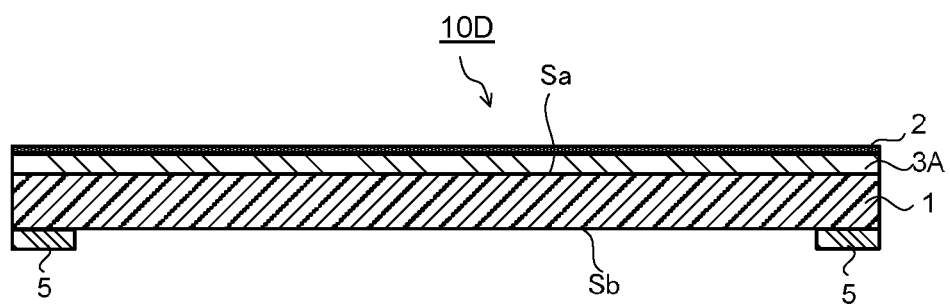
FIG. 6B is a schematic sectional view of the transparent substrate with an antifouling film illustrated in FIG. 6A.

A transparent substrate with an antifouling film 10D illustrated in FIG. 6A and FIG. 6B is an example where, in the transparent substrate with an antifouling film 10A illustrated in FIGS. 1 and 2, a frame-shaped printed layer 5 is provided on a peripheral portion of the main surface Sb, of the transparent substrate 1, opposite to the main surface Sa having the antifouling film 2. FIG. 6A is a schematic bottom view of the transparent substrate with an antifouling film 10D, and FIG. 6B is a schematic sectional view of the transparent substrate with an antifouling film 10D.

The printed layer 5 is provided as required so as to hide wiring circuits, a bonding portion when an image display device is attached to a casing, and so on which are disposed near an outer periphery of the image display device, in order to enhance visibility and appearance of the display, for instance. Here, the peripheral portion means a belt-shaped region having a predetermined width from the outer periphery toward the center portion. The printed layer 5 that the transparent substrate with an antifouling film 10D has is provided on the whole periphery of the main surface Sb, of the transparent substrate 1, opposite to the main surface Sa having the antifouling film 2, but this is not restrictive, and it may be provided on part of the periphery.

The transparent substrate with an antifouling film of the embodiment of the present invention is suitable as, for example, a cover member of various kinds of touch panels, and in particular, in a case where it is used as a cover member of a capacitance in-cell touch panel-type liquid crystal display device, it can exhibit remarkable effects of reducing the whitening of the liquid crystal screen while sufficiently maintaining an antifouling property and touch sensitivity, and also having an antiglare property effect.

[Capacitance in-Cell Touch Panel-Type Liquid Crystal Display Device]

Figure 7:
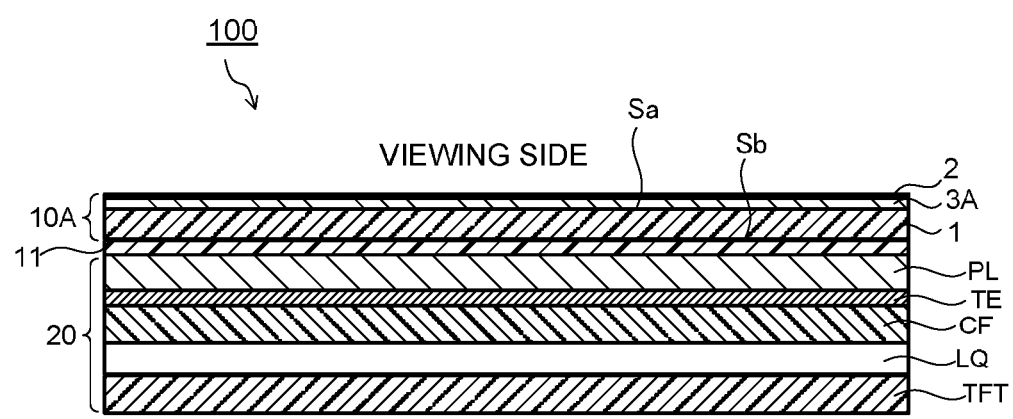
FIG. 7 is a schematic sectional view of an example of a capacitance in-cell touch panel-type liquid crystal display device according to an embodiment.

A capacitance in-cell touch panel-type liquid crystal display device of an embodiment will be described with reference to a schematic sectional view of an example illustrate in FIG. 7.

A capacitance in-cell touch panel-type liquid crystal display device 100 has a capacitance in-cell touch panel-type liquid crystal display element 20 and a transparent substrate with an antifouling film 10A provided on a viewing side of the liquid crystal display element 20.

The transparent substrate with an antifouling film 10A is the above-described transparent substrate with an antifouling film 10A illustrated in FIGS. 1 and 2 and has the transparent substrate 1 and the antifouling film 2 provided as the outermost layer on the main surface Sa of the transparent substrate 1. The shape of the surface 2s of the antifouling film 2 is the rugged shape whose arithmetic mean roughness Ra is 0.01 μm or more, and the surface resistivity measured on the surface 2s of the antifouling film 2 is $1.0 \times 10^9$ to $1.0 \times 10^{13} \Omega/$.

The transparent substrate with an antifouling film 10A is disposed, with the transparent substrate 1 located on the liquid crystal element 20 side and the antifouling film 2 located on the viewing side.

The capacitance in-cell touch panel-type liquid crystal display device 100 includes the transparent substrate with an antifouling film 10A as a transparent substrate with an antifouling film, and in the capacitance in-cell touch panel-type liquid crystal display device of the present invention, any of the transparent substrate with an antifouling films of the embodiments of the present invention described above is usable without any limitation.

Incidentally, in the capacitance in-cell touch panel-type liquid crystal display device 100, the liquid crystal display element 20 and the transparent substrate with an antifouling film 10A are bonded through a transparent adhesive layer 11.

Examples of the transparent adhesive layer 11 include one made only of an adhesive and one in which an adhesive contains various kinds of functional additives such as an ultraviolet absorbent and a conductive agent. As the adhesive, one having a high visible light transmittance and a small difference in refractive index from the transparent substrate is suitable. Examples of the adhesive include an acrylic adhesive, a silicone-based adhesive, an urethane-based adhesive, and a butadiene-based adhesive. Among these, the acrylic adhesive is suitable because it is excellent in optical transparency, exhibits moderate wettability, cohesiveness, and adhesiveness, and is excellent in weather resistance, heat resistance, and so on.

The thickness of the transparent adhesive layer 11 is not limited as long as it can have sufficient adhesiveness without giving an influence on the function of the transparent substrate with an antifouling film 10A, and is preferably about 200 to 300 μm.

The liquid crystal display element 20 is not limited as long as it is a capacitance in-cell touch panel-type liquid crystal display element. The liquid crystal display element 20 is composed of, for example, a polarizing plate (PL), a transparent electrode (TE), a color filter (CF), a liquid crystal layer (LQ), and a TET substrate (TFT) in the order mentioned from the viewing side as illustrated in FIG. 7.

In the capacitance in-cell touch panel-type liquid crystal display device 100, the antifouling film 2, which is the viewing-side outermost layer of the transparent substrate with an antifouling film 10A, has the surface 2s having an antifouling property, having the rugged surface shape whose arithmetic mean roughness Ra is 0.01 μm or more, and having the surface resistivity of $1.0 \times 10^9$ to $1.0 \times 10^{13} \Omega/$.

Setting the rugged shape of the surface 2s of the antifouling film 2 as described above achieves a suitable finger contact area when the surface 2s of the antifouling film 2 is touched with a finger, making it possible for an electric charge quantity to fall within an appropriate range. Further, setting the surface resistivity of the surface 2s of the antifouling film 2 within the aforesaid range achieves an appropriate ESD function. In the present invention, by thus making the electric charge quantity and the ESD function well-balanced, it is possible to reduce the whiteness of the liquid crystal screen while sufficiently maintaining touch sensitivity. Here, it is needless to say that the surface 2s of the antifouling film 2 has the antifouling property, and further the rugged shape of the surface 2s imparts the antiglare property.

As the application of the capacitance in-cell touch panel-type liquid crystal display device of the embodiment, articles loaded on transportation device are preferable because it can exhibit the aforesaid effects.

EXAMPLES

Hereinafter, the present invention will be described in detail by way of examples. However, the present invention is not limited to the following examples. Examples 8-19, 21, 22 and Examples 25 to 40, 43 to 45 are examples and Examples 1 to 7, 20 and Examples 23, 24, 41, 42 are comparative examples, out of Examples 1 to 45. The following describes evaluation methods and materials used in Examples.

<Evaluation Method>
(Surface Properties)

Surface resistivity ($\Omega/$), 60° specular glossiness (Gloss), and an antiglare property index value (Diffusion) in the antifouling film of each transparent substrate with an antifouling film were measured by the aforesaid methods. Further, skewness Rsk of a roughness curve, arithmetic mean roughness Ra, and an average length Rsm of elements of the roughness curve in the antifouling film of each transparent substrate with an antifouling film were measured by the aforesaid methods.

(Haze)

Haze (%) of the transparent substrate with an antifouling film was measured using a haze meter (HR-100 manufactured by MURAKAMI COLOR RESEARCH LABORATORY CO., LTD.) according to the method stipulated in JIS K7136: 2000.

(Evaluation of Cloudiness and Touch Sensitivity of Displays)

Each transparent substrate with an antifouling film was fixed on a capacitance in-cell touch panel-type liquid crystal display element, with its main surface where the antifouling film is formed (rugged surface) being located on the top, using a transparent adhesive. In a power-ON state, cloudiness and touch sensitivity when the surface of the antifouling film of the transparent substrate with an antifouling film was touched with a finger were evaluated according to the following evaluation criteria. Further, from the evaluation results of cloudiness and touch sensitivity, comprehensive evaluation was made.

<Cloudiness Evaluation Criteria>
⊚; no cloudiness of the display
○; slight cloudiness of the display (having practically no influence)
x; conspicuous cloudiness of the display <Touch Sensitivity Evaluation Criteria>
⊚; quick response speed to the touching operation
○; slightly low response speed to the touching operation (having practically no influence)
x; low response speed to the touching operation <Comprehensive Evaluation>
⊚; both cloudiness and touch sensitivity evaluated as ⊚
○; one of cloudiness and touch sensitivity evaluated as ○ and the other evaluated as ⊚
x; one or both of cloudiness and touch sensitivity evaluated as x <Material>
(1) For Antiglare Layer or Conductive Antiglare Layer Formation
(Silica Precursor)

As a silica precursor (a), tetraethoxysilane (hereinafter, referred to as "TEOS") and propyltrimethoxysilane (hereinafter, referred to as "PTMOS") (both are manufactured by Shin-Etsu Chemical Co., Ltd.) were used.

(Scaly Particle Dispersion)

As a scaly particle dispersion, an SLV solution (a scaly silica particle dispersion in which disintegrated SUN-LOVELY LFS HN150 manufactured by AGC Si-Tech Co., Ltd. is dispersed in water) was used. The scaly silica particles in the SLV solution have an average particle size of 175 nm, and an average aspect ratio (average particle size/average thickness) of 80, and the concentration of the scaly silica particles is 5% by mass.

(Conductive Fine Particle Dispersion)

As a conductive fine particle dispersion, used was V-3561 (manufactured by JGC Catalysts and Chemicals Ltd., a dispersion containing about 20% by mass spherical fine particles of antimony-doped tin oxide whose average particle size of several to 20 nm and containing ethanol as a main solvent) or V-4564 (manufactured by JGC Catalysts and Chemicals Ltd., a dispersion containing about 40% by mass spherical fine particles of antimony oxide whose average particle size of several to 20 nm and containing 1-methoxy-2-propanol as a main solvent).

(Liquid Medium)

As a liquid medium, SOLMIX (registered trademark) AP-11 (manufactured by Japan Alcohol Trading Co., Ltd.; a mixed solvent of 85% by mass ethanol, 10% by mass isopropyl alcohol, and 5% by mass methanol, hereinafter referred to as "AP-11"), diacetone alcohol (DAA), and propylene glycol (PG) were used.

(2) For Conductive Layer Formation

The above-described conductive fine particle dispersion and liquid medium were used as materials.

(3) For Antifouling Film Formation
(Fluorine-Containing Organic Silicon Compound)

As a fluorine-containing organic silicon compound, Aflud (registered trademark) S-550 (manufactured by Asahi Glass Co., Ltd.) was used.

(Liquid Medium)

As a fluorine-based solvent, ASAHIKLIN AC-6000 (brand name; manufactured by Asahi Glass Co., Ltd, hereinafter referred to as "AC-6000")) was used.

(Examples 1 to 22): Examples Corresponding to the Transparent Substrate with an Antifouling Film (A) and Comparative Examples As examples corresponding to the transparent substrate with an antifouling film (A), transparent substrate with an antifouling film (I)s of Examples 8 to 19, 21, 22 having the same stacked structure as that of the transparent substrate with an antifouling film 10A in FIG. 2 were fabricated by the following method. As comparative examples, transparent substrate with an antifouling film (Icf)s of Examples 1 to 7, 20 each having an antiglare layer or a conductive antiglare layer which does not satisfy the condition of the present invention instead of the conductive antiglare layer were fabricated by the same method.

(Preparation of Conductive Antiglare Layer-Forming Liquid Compositions for Examples 4 to 19)

Precursor solutions of conductive antiglare layer-forming liquid compositions were prepared using AP-11, alkoxysilane, a nitric acid aqueous solution with a 60% by mass concentration, the conductive fine particle dispersion, and the SLV solution in the amounts indicated in Examples 4 to 19 in Table 1. At this time, while stirring with a magnetic stirrer, the alkoxysilane, the conductive fine particle dispersion, and the SLV solution were added to AP-11 and they were mixed at 25° C. for thirty minutes. To these mixed solutions, the nitric acid aqueous solution with the 60% by mass concentration was dropped in the amounts indicated in Examples 4 to 19 in Table 1, followed by further mixing at 60° C. for sixty minutes, whereby the precursor solutions of the conductive antiglare layer-forming liquid compositions were obtained. The obtained precursor solutions each in an amount of 100 g were diluted with diluting solvents indicated in Examples 4 to 19 in Table 1, whereby the conductive antiglare layer-forming liquid compositions were obtained.

(Preparation of Conductive Antiglare Layer-Forming Liquid Compositions for Examples 20 to 22)

Precursor solutions of conductive antiglare layer-forming liquid compositions were prepared using AP-11, alkoxysilane, a nitric acid aqueous solution with a 10% by mass concentration, the conductive fine particle dispersion, and water in the amounts indicated in Examples 20 to 22 in Table 1. At this time, while stirring with a magnetic stirrer, the alkoxysilane was added to part of AP-11, followed by mixing at 25° C. for thirty minutes. To these mixed solutions, the nitric acid aqueous solution with the 10% by mass concentration was dropped in the amounts indicated in Table 1, followed by mixing at 25° C. for sixty minutes. Further, to these mixed solutions, the rest of AP-11 and the conductive fine particle dispersion were added, followed by mixing at 25° C. for fifteen minutes, whereby the precursor solutions of the conductive antiglare layer-forming liquid compositions were obtained. The obtained precursor solutions were diluted with diluting solvents indicated in Examples 20 to 22 in Table 1, whereby the conductive antiglare layer-forming liquid compositions were obtained.

(Preparation of Antiglare Layer-Forming Liquid Compositions for Examples 1 to 3)

Precursor solutions of antiglare layer-forming liquid compositions were prepared using AP-11, alkoxysilane, a nitric acid aqueous solution with a 60% by mass concentration, and the SLV solution in the amounts indicated in Examples 1 to 3 in Table 1. At this time, while stirring with a magnetic stirrer, the alkoxysilane and the SLV solution were added to AP-11, followed by mixing at 25° C. for thirty minutes. To these mixed solutions, the nitric acid aqueous solution with the 60% by mass concentration was dropped in the amounts indicated in Examples 1 to 3 in Table 1, followed by further mixing at 60° C. for sixty minutes, whereby the precursor solutions of the antiglare layer-forming liquid compositions were obtained. The obtained precursor solutions each in an amount of 100 g were diluted with diluting solvents indicated in Examples 1 to 3 in Table 1, whereby the antiglare layer-forming liquid compositions were obtained.

(Preparation of Antifouling Film-Forming Compositions)

Aflud S-550 was added to AC-6000 so that a content of Aflud S-550 became 0.1% by mass, followed by sufficient mixing by stirring, whereby antifouling film-forming compositions were obtained.

(Fabrication of Transparent Substrate with an Antifouling Film (I)s and (Icf)s)

The conductive antiglare layer-forming liquid compositions or the antiglare layer-forming liquid compositions obtained above were applied on cleaned and dried glass substrates (soda-lime glass formed by a float method, thickness of 1 mm) by an electrostatic coater (a liquid electrostatic coater manufactured by Asahi Sunac Corporation) to form applied films. As an electrostatic coating gun of the electrostatic coater, a rotary atomizing automatic electrostatic gun (Sunbell, ESA120 manufactured by Asahi Sunac Corporation, cup diameter of 70 mm) was used.

In a coating booth of the electrostatic coater, the temperature was adjusted within a range of 25±1.5° C. and the humidity was adjusted within a range of 50%±10%. The cleaned glass substrates heated to 25° C.±1° C. in advance were each placed on a chain conveyor of the electrostatic coater with a stainless plate therebetween. While the glass substrates were each carried by the chain conveyor at a uniform rate of 3.0 m/minute, the conductive antiglare layer-forming liquid compositions or the antiglare layer-forming liquid compositions whose temperature was within a range of 25° C.±1° C. were applied on the top surfaces of the glass substrates the predetermined number of times indicated in Table 1 by an electrostatic coating method and thereafter were burned at 300° C. for sixty minutes in the atmosphere to form conductive antiglare layers or antiglare layers, whereby conductive antiglare layer-coated substrates or antiglare layer-coated substrates were obtained. Antifouling films were formed on the respective conductive antiglare layers or antiglare layers of the obtained conductive antiglare layer-coated substrates or antiglare layer-coated substrates as follows.

To form the antifouling film, a nozzle of a spray device is moved in parallel to the conductive antiglare layer-coated substrate or the antiglare layer-coated substrate in a first direction from one end toward the other end of the substrate, thereby applying the antifouling film-forming composition. The nozzle reaching the other end is moved in parallel to the substrate in a second direction perpendicular to the first direction by a predetermined distance (hereinafter, referred to as a pitch). The nozzle is moved again in parallel from the other end toward the one end. This is repeated to apply the composition until a coated area ranges over the whole surface of the conductive antiglare layer-coated substrate or the antiglare layer-coated substrate.

The above-described evaluation was conducted on the transparent substrate with an antifouling film (I)s and (Icf)s which were thus obtained. Table 2 shows the results.

TABLE 1

| Example | Compounding amounts of components of precursor solution [g] | | | | | | | | | | SLV solution | Number of application times |
|---|---|---|---|---|---|---|---|---|---|---|---|---|
| | Diluting solvent [g] | | | Alkoxysilane | | | Water | Nitric acid | Conductive fine particle dispersion | | | |
| | AP-11 | DAA | PG | AP-11 | TEOS | PTMOS | | | Kind | Amount | | |
| 1 | 695.68 | 2.40 | 1.92 | 79.32 | 10.75 | 1.82 | 0.00 | 0.14 | — | 0.00 | 8.00 | 2 |
| 2 | 695.68 | 2.40 | 1.92 | 95.72 | 12.90 | 1.64 | 0.00 | 0.14 | — | 0.00 | 9.60 | 2 |
| 3 | 695.68 | 2.40 | 1.92 | 95.72 | 12.90 | 1.64 | 0.00 | 0.14 | — | 0.00 | 9.60 | 1 |
| 4 | 695.68 | 2.40 | 1.92 | 97.40 | 12.07 | 1.64 | 0.00 | 0.14 | V-4564 | 1.55 | 9.60 | 2 |
| 5 | 695.68 | 2.40 | 1.92 | 95.32 | 11.23 | 1.64 | 0.00 | 0.14 | V-4564 | 2.06 | 9.60 | 1 |
| 6 | 695.68 | 2.40 | 1.92 | 99.49 | 12.90 | 1.64 | 0.00 | 0.14 | V-4564 | 1.03 | 9.60 | 1 |
| 7 | 695.68 | 2.40 | 1.92 | 99.49 | 12.90 | 1.64 | 0.00 | 0.14 | V-4564 | 1.03 | 9.60 | 2 |
| 8 | 695.68 | 2.40 | 1.92 | 94.48 | 11.65 | 0.00 | 0.00 | 0.14 | V-4564 | 4.12 | 9.60 | 1 |
| 9 | 715.68 | 2.40 | 1.92 | 95.32 | 11.23 | 1.64 | 0.00 | 0.14 | V-4564 | 2.06 | 9.60 | 2 |
| 10 | 735.68 | 2.40 | 1.92 | 95.32 | 11.23 | 1.64 | 0.00 | 0.14 | V-4564 | 2.06 | 9.60 | 2 |
| 11 | 695.68 | 2.40 | 1.92 | 94.08 | 9.99 | 0.00 | 0.00 | 0.14 | V-4564 | 6.19 | 9.60 | 1 |
| 12 | 695.68 | 2.40 | 1.92 | 73.13 | 8.32 | 0.00 | 0.00 | 0.14 | V-3561 | 28.80 | 9.60 | 1 |
| 13 | 695.68 | 2.40 | 1.92 | 67.60 | 6.66 | 0.00 | 0.00 | 0.14 | V-3561 | 36.00 | 9.60 | 1 |
| 14 | 695.68 | 2.40 | 1.92 | 94.48 | 11.65 | 0.00 | 0.00 | 0.14 | V-4564 | 4.12 | 9.60 | 2 |
| 15 | 695.68 | 2.40 | 1.92 | 67.60 | 6.66 | 0.00 | 0.00 | 0.14 | V-3561 | 36.00 | 9.60 | 2 |
| 16 | 695.68 | 2.40 | 1.92 | 94.48 | 11.65 | 0.00 | 0.00 | 0.14 | V-4564 | 4.12 | 9.60 | 3 |
| 17 | 695.68 | 2.40 | 1.92 | 94.08 | 9.99 | 0.00 | 0.00 | 0.14 | V-4564 | 6.19 | 9.60 | 3 |
| 18 | 695.68 | 2.40 | 1.92 | 93.69 | 8.32 | 0.00 | 0.00 | 0.14 | V-4564 | 8.25 | 9.60 | 3 |
| 19 | 695.68 | 2.40 | 1.92 | 93.29 | 6.66 | 0.00 | 0.00 | 0.14 | V-4564 | 10.31 | 9.60 | 3 |
| 20 | 475.00 | 0.00 | 0.00 | 19.08 | 3.47 | 0.00 | 1.15 | 0.04 | V-3561 | 1.25 | 0.00 | 2 |
| 21 | 250.00 | 0.00 | 0.00 | 42.83 | 3.47 | 0.00 | 1.15 | 0.04 | V-3561 | 2.50 | 0.00 | 2 |
| 22 | 250.00 | 0.00 | 0.00 | 42.83 | 3.47 | 0.00 | 1.15 | 0.04 | V-3561 | 2.50 | 0.00 | 4 |

TABLE 2

| Example | Haze | Gloss 60 deg. | Diffusion | Ra μm | Rsm μm | Rsk | Surface resistivity [Ω/□] | Cloudiness of display | Touch sensitivity | Comprehensive evaluation |
|---|---|---|---|---|---|---|---|---|---|---|
| 1 | 7 | 82 | 0.24 | 0.07 | 16.95 | 0.78 | $1.8 \times 10^{15}$ | X | ◎ | X |
| 2 | 10 | 68 | 0.27 | 0.09 | 17.30 | 1.48 | $8.5 \times 10^{14}$ | X | ◎ | X |
| 3 | 7 | 96 | 0.14 | 0.06 | 18.30 | 2.18 | $6.1 \times 10^{14}$ | X | ◎ | X |
| 4 | 5 | 98 | 0.23 | 0.06 | 17.92 | 1.10 | $5.8 \times 10^{14}$ | X | ◎ | X |
| 5 | 7 | 100 | 0.16 | 0.06 | 15.84 | 1.89 | $2.5 \times 10^{13}$ | X | ◎ | X |
| 6 | 2 | 108 | 0.14 | 0.05 | 21.72 | 2.33 | $1.4 \times 10^{13}$ | X | ◎ | X |
| 7 | 5 | 86 | 0.20 | 0.06 | 21.28 | 1.37 | $1.1 \times 10^{13}$ | X | ◎ | X |
| 8 | 4 | 119 | 0.11 | 0.04 | 15.11 | 1.95 | $9.1 \times 10^{12}$ | ○ | ◎ | ○ |
| 9 | 6 | 98 | 0.27 | 0.05 | 14.97 | 1.56 | $4.6 \times 10^{12}$ | ○ | ◎ | ○ |
| 10 | 5 | 100 | 0.13 | 0.04 | 13.61 | 1.11 | $6.1 \times 10^{12}$ | ○ | ◎ | ○ |
| 11 | 5 | 116 | 0.13 | 0.04 | 15.59 | 1.74 | $3.4 \times 10^{12}$ | ○ | ◎ | ○ |
| 12 | 12 | 86 | 0.11 | 0.05 | 54.30 | 3.12 | $1.8 \times 10^{12}$ | ○ | ◎ | ○ |
| 13 | 13 | 75 | 0.11 | 0.04 | 49.58 | 2.97 | $8.6 \times 10^{11}$ | ◎ | ◎ | ◎ |
| 14 | 8 | 96 | 0.18 | 0.06 | 15.17 | 1.78 | $3.9 \times 10^{11}$ | ◎ | ◎ | ◎ |
| 15 | 23 | 37 | 0.19 | 0.05 | 42.77 | 2.01 | $2.9 \times 10^{11}$ | ◎ | ◎ | ◎ |
| 16 | 12 | 76 | 0.22 | 0.07 | 15.75 | 1.39 | $9.2 \times 10^{10}$ | ◎ | ◎ | ◎ |
| 17 | 14 | 70 | 0.25 | 0.07 | 15.09 | 1.03 | $3.1 \times 10^{10}$ | ◎ | ◎ | ◎ |
| 18 | 15 | 72 | 0.25 | 0.07 | 14.85 | 1.47 | $9.3 \times 10^{9}$ | ◎ | ○ | ◎ |
| 19 | 24 | 52 | 0.31 | 0.08 | 13.63 | 1.32 | $6.0 \times 10^{9}$ | ◎ | ○ | ◎ |

TABLE 2-continued

| Example | Haze | Gloss 60 deg. | Diffusion | Ra μm | Rsm μm | Rsk | Surface resistivity [Ω/□] | Cloudiness of display | Touch sensitivity | Comprehensive evaluation |
|---|---|---|---|---|---|---|---|---|---|---|
| 20 | 2 | 116 | 0.14 | 0.03 | 19.02 | 0.58 | $4.4 \times 10^{14}$ | X | ◉ | X |
| 21 | 3 | 108 | 0.16 | 0.04 | 16.51 | 0.71 | $3.9 \times 10^{12}$ | ○ | ◉ | ○ |
| 22 | 3 | 103 | 0.30 | 0.05 | 22.49 | 0.31 | $3.8 \times 10^{11}$ | ◉ | ◉ | ◉ |

(Examples 23 to 45) Examples Corresponding to the Transparent Substrate with an Antifouling Film (B)

As examples corresponding to the transparent substrate with an antifouling film (B), transparent substrate with an antifouling film (II)s of Examples 25 to 40, 43 to 45 having the same stacked structure as that of the transparent substrate with an antifouling film 10Ba in FIG. 3 were fabricated by the following method. As comparative examples, transparent substrate with an antifouling film (IIcf)s of Examples 23, 24, 41, 42 each having a conductive layer not satisfying the condition of the present invention were fabricated by the same method.

(Preparation of Conductive Layer-Forming Compositions for Examples 23 to 42)

The conductive fine particle dispersion V-4564 or V3561, TEOS, water, and a 60% by mass nitric acid aqueous solution were mixed using AP-11, in the masses indicated in the precursor solutions of the conductive layer-forming compositions for Examples 23 to 42 in Table 3, and the mixtures were stirred at a room temperature of 25° C. for one hour and thereafter left standing still at 5° C. for 24 hours. Next, diluting solvents in the masses in Table 3 and the respective precursor solutions were mixed, whereby the conductive layer-forming compositions were obtained.

(Preparation of Conductive Layer-Forming Compositions for Examples 43 to 45)

The conductive fine particle dispersion V-4564 or V3561, TEOS, water, and a 10% by mass nitric acid aqueous solution were mixed using AP-11, in the masses indicated in the precursor solutions of the conductive layer-forming compositions of Examples 43 to 45 in Table 3, and the mixtures were stirred at 60° C. for one hour and thereafter left standing still at 5° C. for 24 hours. Next, diluting solvents in the masses in Table 3 and the respective precursor solutions were mixed, whereby the conductive layer-forming compositions were obtained.

(Preparation of Antiglare Layer-Forming Liquid Compositions and Conductive Antiglare Layer-Forming Liquid Compositions)

Antiglare layer-forming liquid compositions or conductive antiglare layer-forming liquid compositions were fabricated using the same components indicated in Examples 1, Example 2, or Example 20 in Table 1 by the same method.

(Fabrication of Transparent Substrate with an Antifouling Film (II)s and (IIcf)s)

The above-described conductive layer-forming compositions were applied on cleaned and dried glass substrates (soda-lime glass formed by a float method, thickness of 1 mm) by an electrostatic coater (a liquid electrostatic coater manufactured by Asahi Sunac Corporation) the predetermined number of times indicated in Table 3 to form applied films. As an electrostatic coating gun of the electrostatic coater, a rotary atomizing automatic electrostatic gun (Sunbell, ESA120 manufactured by Asahi Sunac Corporation, cup diameter of 70 mm) was used.

In a coating booth of the electrostatic coater, the temperature was adjusted within a range of 25±1.5° C. and the humidity was adjusted within a range of 50%±10%. The cleaned glass substrates heated to 30° C.±3° C. in advance were each placed on a chain conveyor of the electrostatic coater with a stainless plate therebetween. While the glass substrates were each carried by the chain conveyor at a uniform rate of 3.0 m/minute, the conductive layer-forming compositions whose temperature was within a range of 25±1.5° C. were applied on top surfaces (surfaces opposite to the surfaces in contact with molten tin during the production by the float method) of the glass substrates the predetermined number of times by an electrostatic coating method and thereafter were burned at 200° C. for one minute in the atmosphere to form conductive layer-coated substrates.

In Examples 23 to 42, the same antiglare layer-forming liquid compositions as that of Example 1 or Example 2 obtained above were applied on the conductive layers of the conductive layer-coated substrates to form applied films by an electrostatic coater (a liquid electrostatic coater manufactured by Asahi Sunac Corporation). As an electrostatic coating gun of the electrostatic coater, a rotary atomizing automatic electrostatic gun (Sunbell, ESA120 manufactured by Asahi Sunac Corporation, cup diameter of 70 mm) was used.

In a coating booth of the electrostatic coater, the temperature was adjusted within a range of 25±1.5° C. and the humidity was adjusted within a range of 50%±10%. The conductive layer-coated substrates heated to 30° C.±3° C. in advance were each placed on a chain conveyor of the electrostatic coater with a stainless plate therebetween. While the conductive layer-coated substrates were each carried by the chain conveyor at a uniform rate of 3.0 m/minute, the antiglare layer-forming liquid compositions whose temperature was within a range of 25±1.5° C. were applied on the conductive layers of the conductive layer-coated substrates twice by an electrostatic coating method and thereafter were burned at 300° C. for sixty minutes in the atmosphere to form antiglare layers, whereby conductive layer and antiglare layer-coated substrates were obtained. Antifouling films were formed on the antiglare layers of the obtained conductive layer and antiglare layer-coated substrates in the same manner as in the aforesaid Example 1, whereby the transparent substrate with an antifouling film (II)s and (IIcf)s were obtained.

In Examples 43 to 45, the transparent substrate with an antifouling film (II)s were obtained in the same manner except that the same conductive antiglare layer-forming liquid composition as that in Example 20 obtained above was used instead of the antiglare layer-forming liquid compositions used in the aforesaid Examples 23 to 42.

The aforesaid evaluation was made on the transparent substrate with an antifouling film (II)s and (IIcf)s which were obtained in this manner. Table 4 shows the results.

TABLE 3

Conductive layer-forming composition

| Example | Diluting solvent [g] AP-11 | Diluting solvent [g] DAA | Compounding amounts of components of precursor solution [g] AP-11 | Compounding amounts of components of precursor solution [g] TEOS | Compounding amounts of components of precursor solution [g] Water | Compounding amounts of components of precursor solution [g] Nitric acid | Conductive fine particle dispersion Kind | Conductive fine particle dispersion Amount | Number of application times | (Conductivity) antiglare layer-forming liquid composition |
|---|---|---|---|---|---|---|---|---|---|---|
| 23 | 350.00 | 0.00 | 49.50 | 0.00 | 0.00 | 0.00 | V-3561 | 0.50 | 2 | Same as Example 2 |
| 24 | 350.00 | 0.00 | 49.50 | 0.00 | 0.00 | 0.00 | V-3561 | 0.50 | 1 | Same as Example 2 |
| 25 | 350.00 | 0.00 | 49.75 | 0.00 | 0.00 | 0.00 | V-4564 | 0.25 | 5 | Same as Example 2 |
| 26 | 350.00 | 0.00 | 49.75 | 0.00 | 0.00 | 0.00 | V-4564 | 0.25 | 4 | Same as Example 2 |
| 27 | 329.30 | 20.7 | 48.58 | 0.520 | 0.141 | 0.007 | V-3561 | 0.75 | 2 | Same as Example 1 |
| 28 | 350.00 | 0.00 | 49.50 | 0.00 | 0.00 | 0.00 | V-3561 | 0.50 | 4 | Same as Example 2 |
| 29 | 329.30 | 20.7 | 48.58 | 0.520 | 0.141 | 0.007 | V-3561 | 0.75 | 4 | Same as Example 1 |
| 30 | 329.60 | 20.4 | 48.61 | 0.694 | 0.189 | 0.009 | V-4564 | 0.50 | 2 | Same as Example 1 |
| 31 | 350.00 | 0.00 | 49.75 | 0.00 | 0.00 | 0.00 | V-4564 | 0.25 | 6 | Same as Example 2 |
| 32 | 329.30 | 20.7 | 48.58 | 0.520 | 0.141 | 0.007 | V-3561 | 0.75 | 6 | Same as Example 1 |
| 33 | 329.60 | 20.4 | 45.27 | 1.733 | 0.471 | 0.022 | V-3561 | 2.50 | 2 | Same as Example 1 |
| 34 | 350.00 | 0.00 | 45.00 | 0.00 | 0.00 | 0.00 | V-3561 | 5.00 | 1 | Same as Example 2 |
| 35 | 327.50 | 22.5 | 45.27 | 1.733 | 0.471 | 0.022 | V-3561 | 2.50 | 4 | Same as Example 1 |
| 36 | 329.00 | 21.0 | 46.52 | 1.734 | 0.471 | 0.023 | V-4564 | 1.25 | 4 | Same as Example 1 |
| 37 | 350.00 | 0.00 | 47.50 | 0.00 | 0.00 | 0.00 | V-3561 | 2.50 | 6 | Same as Example 2 |
| 38 | 329.00 | 21.0 | 46.52 | 1.734 | 0.471 | 0.023 | V-4564 | 1.25 | 6 | Same as Example 1 |
| 39 | 350.00 | 0.00 | 45.00 | 0.00 | 0.00 | 0.00 | V-3561 | 5.00 | 2 | Same as Example 2 |
| 40 | 350.00 | 0.00 | 45.00 | 0.00 | 0.00 | 0.00 | V-3561 | 5.00 | 3 | Same as Example 2 |
| 41 | 350.00 | 0.00 | 45.00 | 0.00 | 0.00 | 0.00 | V-3561 | 5.00 | 4 | Same as Example 2 |
| 42 | 350.00 | 0.00 | 45.00 | 0.00 | 0.00 | 0.00 | V-3561 | 5.00 | 6 | Same as Example 2 |
| 43 | 208.33 | 0.00 | 117.2 | 34.7 | 13.9 | 0.90 | V-3561 | 25.0 | 2 | Same as Example 20 |
| 44 | 208.33 | 0.00 | 117.2 | 34.7 | 13.9 | 0.90 | V-3561 | 25.0 | 4 | Same as Example 20 |
| 45 | 208.33 | 0.00 | 117.2 | 34.7 | 13.9 | 0.90 | V-3561 | 25.0 | 6 | Same as Example 20 |

TABLE 4

| Example | Haze | Gloss 60 deg. | Diffusion | Ra μm | Rsm μm | Rsk — | Surface resistivity [Ω/□] | Cloudiness of display | Touch sensitivity | Comprehensive evaluation |
|---|---|---|---|---|---|---|---|---|---|---|
| 23 | 18 | 44 | 0.35 | 0.09 | 15.10 | 0.85 | $2.1 \times 10^{13}$ | X | ◎ | X |
| 24 | 18 | 43 | 0.41 | 0.11 | 17.91 | 1.27 | $1.8 \times 10^{13}$ | X | ◎ | X |
| 25 | 15 | 60 | 0.19 | 0.08 | 13.57 | 1.14 | $1.0 \times 10^{13}$ | ○ | ◎ | ○ |
| 26 | 15 | 59 | 0.21 | 0.08 | 14.14 | 1.23 | $7.4 \times 10^{12}$ | ○ | ◎ | ○ |
| 27 | 8 | 78 | 0.32 | 0.07 | 17.02 | 1.06 | $6.6 \times 10^{12}$ | ○ | ◎ | ○ |
| 28 | 21 | 40 | 0.34 | 0.10 | 14.98 | 1.11 | $5.8 \times 10^{12}$ | ○ | ◎ | ○ |
| 29 | 8 | 79 | 0.32 | 0.07 | 16.67 | 1.06 | $2.9 \times 10^{12}$ | ○ | ◎ | ○ |
| 30 | 9 | 76 | 0.34 | 0.07 | 17.33 | 0.88 | $2.3 \times 10^{12}$ | ○ | ◎ | ○ |
| 31 | 16 | 59 | 0.19 | 0.08 | 14.07 | 1.32 | $2.1 \times 10^{12}$ | ○ | ◎ | ○ |
| 32 | 8 | 79 | 0.32 | 0.07 | 17.80 | 1.09 | $9.7 \times 10^{11}$ | ◎ | ◎ | ◎ |
| 33 | 9 | 75 | 0.36 | 0.08 | 17.37 | 0.99 | $6.1 \times 10^{11}$ | ◎ | ◎ | ◎ |
| 34 | 25 | 42 | 0.22 | 0.11 | 14.67 | 1.59 | $5.7 \times 10^{11}$ | ◎ | ◎ | ◎ |
| 35 | 9 | 74 | 0.40 | 0.09 | 17.20 | 0.92 | $1.5 \times 10^{11}$ | ◎ | ◎ | ◎ |
| 36 | 9 | 73 | 0.55 | 0.09 | 20.14 | 0.77 | $8.1 \times 10^{10}$ | ◎ | ◎ | ◎ |
| 37 | 49 | 23 | 0.21 | 0.14 | 11.09 | 0.97 | $3.6 \times 10^{10}$ | ◎ | ◎ | ◎ |
| 38 | 9 | 70 | 0.77 | 0.14 | 46.74 | 1.06 | $2.6 \times 10^{10}$ | ◎ | ◎ | ◎ |
| 39 | 26 | 46 | 0.17 | 0.11 | 13.91 | 1.68 | $5.3 \times 10^{9}$ | ◎ | ○ | ○ |
| 40 | 30 | 41 | 0.18 | 0.12 | 12.99 | 1.75 | $1.3 \times 10^{9}$ | ◎ | ○ | ○ |
| 41 | 35 | 36 | 0.15 | 0.13 | 12.50 | 1.47 | $8.7 \times 10^{8}$ | ◎ | X | X |
| 42 | 40 | 34 | 0.14 | 0.14 | 12.43 | 1.27 | $5.1 \times 10^{8}$ | ◎ | X | X |
| 43 | 3 | 109 | 0.16 | 0.04 | 17.01 | 0.71 | $7.7 \times 10^{11}$ | ◎ | ◎ | ◎ |
| 44 | 3 | 107 | 0.19 | 0.04 | 19.53 | 0.45 | $7.7 \times 10^{10}$ | ◎ | ◎ | ◎ |
| 45 | 4 | 103 | 0.22 | 0.05 | 19.32 | 0.63 | $3.5 \times 10^{10}$ | ◎ | ◎ | ◎ |

What is claimed is:

1. A transparent substrate with an antifouling film comprising:
a transparent substrate;
an antifouling film provided as an outermost layer on one main surface of the transparent substrate; and
a layer comprising a conductive agent between said transparent substrate and said antifouling film, wherein
the conductive agent is one or more selected from the group consisting of a quaternary ammonium salt, a lithium salt, a metal fine particle, a metal oxide fine particle, a carbon nanotube, a coating fine particle, and a polyethylene dioxythiophene-based particle, and
a surface shape of the antifouling film is a rugged shape whose arithmetic mean roughness Ra is 0.01 μm or more, and surface resistivity measured on the surface of the antifouling film is $1.0 \times 10^9$ to $1.0 \times 10^{13} \Omega/\square$,
wherein when the conductive agent is a metal oxide fine particle, the metal oxide fine particle is selected from the group consisting of tin oxide ($SnO_2$), antimony oxide (Sb$_2$O$_5$), antimony-doped tin oxide (ATO), antimony-doped titanium oxide, indium-doped tin oxide (ITO), phosphorus-doped tin oxide, aluminum-doped zinc oxide (AZO), fluorinated tin oxide (FTO), antimony-doped zinc oxide, and zinc oxide (ZnO).

2. The transparent substrate with an antifouling film according to claim 1, further comprising a conductive antiglare layer having conductivity between the transparent substrate and the antifouling film,
wherein a main surface, of the conductive antiglare layer, facing the antifouling film diffusely reflects an incident light.

3. The transparent substrate with an antifouling film according to claim 1, further comprising a conductive layer and an antiglare layer between the transparent substrate and the antifouling film,
wherein a main surface, of the antiglare layer, facing the antifouling film diffusely reflects an incident light.

4. The transparent substrate with an antifouling film according to claim 3, wherein the antiglare layer and the conductive layer are provided in the order mentioned from the transparent substrate side, and an adhesive layer is provided between the conductive layer and the antifouling film.

5. The transparent substrate with an antifouling film according to claim 1, further comprising a conductive layer between the transparent substrate and the antifouling film,
wherein a main surface, of the transparent substrate, facing the antifouling film diffusely reflects an incident light.

6. The transparent substrate with an antifouling film according to claim 5, further comprising an adhesive layer between the conductive layer and the antifouling film.

7. The transparent substrate with an antifouling film according to claim 1, wherein skewness Rsk of a roughness curve of the surface of the antifouling film is −1.5 to 1.5.

8. The transparent substrate with an antifouling film according to claim 1, wherein the transparent substrate is a glass substrate.

9. A capacitance in-cell touch panel-type liquid crystal display device comprising:
a capacitance in-cell touch panel-type liquid crystal display element; and
a transparent substrate with an antifouling film,
the transparent substrate with an antifouling film comprising: a transparent substrate; an antifouling film provided as an outermost layer on one main surface of the transparent substrate; and a layer comprising a conductive agent between said transparent substrate and said antifouling film,
wherein
the conductive agent is one or more selected from the group consisting of a quaternary ammonium salt, a lithium salt, a metal fine particle, a metal oxide fine particle, a carbon nanotube, a coating fine particle, and a polyethylene dioxythiophene-based particle, and
a surface shape of the antifouling film is a rugged shape whose arithmetic mean roughness Ra is 0.01 μm or more, surface resistivity measured on the surface of the antifouling film is $1.0 \times 10^9$ to $1.0 \times 10^{13} \Omega/\square$, and the transparent substrate with an antifouling film is disposed on a viewing side of the liquid crystal display element, with the transparent substrate being located on a side facing the liquid crystal display element,
wherein when the conductive agent is a metal oxide fine particle, the metal oxide fine particle is selected from the group consisting of tin oxide (SnO$_2$), antimony oxide (Sb$_2$O$_5$), antimony-doped tin oxide (ATO), antimony-doped titanium oxide, indium-doped tin oxide (ITO), phosphorus-doped tin oxide, aluminum-doped zinc oxide (AZO), fluorinated tin oxide (FTO), antimony-doped zinc oxide, and zinc oxide (ZnO).

10. The capacitance in-cell touch panel-type liquid crystal display device according to claim 9, wherein skewness Rsk of a roughness curve of the surface of the antifouling film is −1.5 to 1.5.

11. The transparent substrate with an antifouling film according to claim 1, wherein the conductive agent is a metal fine particle and the metal is selected from the group consisting of Au, Ag, Cu, Al, Fe, Ni, Pd, Pt, Ru, and an alloy of these metals.

12. The transparent substrate with an antifouling film according to claim 1, wherein the conductive agent is a coating fine particle and said coating fine particle comprises a conductive coating layer on the surface of a core fine particle,
wherein the core fine particle is selected from the group consisting of a colloidal silica fine particle, a fluorocarbon resin fine particle, an acrylic resin fine particle, a silicone resin fine particles, and a fine particle of an organic-inorganic composite particle, and
the conductive coating layer is a metal or a metal oxide.

13. The transparent substrate with an antifouling film according to claim 1, wherein the conductive agent is a quaternary ammonium salt or a lithium salt.

14. The transparent substrate with an antifouling film according to claim 1, wherein the conductive agent is a carbon nanotube.

15. The transparent substrate with an antifouling film according to claim 1, wherein the conductive agent is a polyethylene dioxythiophene-based particle.

16. The capacitance in-cell touch panel-type liquid crystal display device according to claim 9, wherein the conductive agent is a metal fine particle and the metal is selected from the group consisting of Au, Ag, Cu, Al, Fe, Ni, Pd, Pt, Ru, and an alloy of these metals.

17. The capacitance in-cell touch panel-type liquid crystal display device according to claim 9, wherein the conductive agent is a coating fine particle and said coating fine particle comprises a conductive coating layer on the surface of a core fine particle,
wherein the core fine particle is selected from the group consisting of a colloidal silica fine particle, a fluorocarbon resin fine particle, an acrylic resin fine particle, a silicone resin fine particles, and a fine particle of an organic-inorganic composite particle, and
the conductive coating layer is a metal or a metal oxide.

18. The capacitance in-cell touch panel-type liquid crystal display device according to claim 9, wherein the conductive agent is a quaternary ammonium salt or a lithium salt.

19. The capacitance in-cell touch panel-type liquid crystal display device according to claim 9, wherein the conductive agent is a carbon nanotube.

20. The capacitance in-cell touch panel-type liquid crystal display device according to claim 9, wherein the conductive agent is a polyethylene dioxythiophene-based particle.

* * * * *